(12) United States Patent
De Waal Malefijt et al.

(10) Patent No.: US 9,539,759 B2
(45) Date of Patent: Jan. 10, 2017

(54) CRADLE FOR A WIND TURBINE BLADE

(71) Applicant: LM WP PATENT HOLDING A/S, Kolding (DK)

(72) Inventors: Bernard Willem De Waal Malefijt, Abenraa (DK); Rasmus Duegaard Jensen, Kolding (DK)

(73) Assignee: LM WP PATENT HOLDING A/S, Kolding (DK)

( * ) Notice: Subject to any disclaimer, the term of this patent is extended or adjusted under 35 U.S.C. 154(b) by 157 days.

(21) Appl. No.: 14/374,991

(22) PCT Filed: Jan. 31, 2013

(86) PCT No.: PCT/EP2013/051896
§ 371 (c)(1),
(2) Date: Jul. 28, 2014

(87) PCT Pub. No.: WO2013/113813
PCT Pub. Date: Aug. 8, 2013

(65) Prior Publication Data
US 2015/0033544 A1  Feb. 5, 2015

(30) Foreign Application Priority Data

Feb. 2, 2012 (EP) ..................................... 12153694
Dec. 20, 2012 (GB) .................................. 1222982.9

(51) Int. Cl.
*B29C 65/78* (2006.01)
*B25B 11/00* (2006.01)
(Continued)

(52) U.S. Cl.
CPC ......... *B29C 65/7847* (2013.01); *B25B 11/005* (2013.01); *B29C 31/00* (2013.01); *F03D 1/0675* (2013.01); *B29C 65/48* (2013.01); *B29C 65/7802* (2013.01); *B29C 65/7841* (2013.01); *B29C 66/1142* (2013.01); *B29C 66/54* (2013.01);
(Continued)

(58) Field of Classification Search
CPC .. B29C 65/7847; B29C 31/00; B29C 65/7841; B29C 65/7802; B29C 66/54; B29C 65/48; B29C 66/1142; B25B 11/005; F03D 1/0675; Y02P 70/523; Y10T 29/49998; B29L 2031/085; Y02E 10/721
See application file for complete search history.

(56) References Cited

U.S. PATENT DOCUMENTS

2007/0272723 A1  11/2007  Kimura et al.
2009/0070977 A1  3/2009   Livingston et al.
(Continued)

FOREIGN PATENT DOCUMENTS

DE   102009033164 A1   1/2011
WO   2012019610 A1     2/2012

*Primary Examiner* — John C Hong
(74) *Attorney, Agent, or Firm* — Nath, Goldberg & Meyer; Jerald L. Meyer; Tanya E. Harkins

(57) ABSTRACT

A blade support cradle is described, which can be used to support a section of a wind turbine blade using an array of vacuum clamps. The cradle provides a secure and reliable system for the support of a blade section during and after blade manufacture, allowing for various operations to be easily carried out on the surface of the blade section. A method for receiving a blade section in the cradle is further described. In addition, the cradle may be used as part of a blade post-molding station in a method of manufacturing a wind turbine blade.

26 Claims, 13 Drawing Sheets

(51) Int. Cl.
*F03D 1/06* (2006.01)
*B29C 31/00* (2006.01)
B29L 31/08 (2006.01)
B29C 65/48 (2006.01)
B29C 65/00 (2006.01)

(52) U.S. Cl.
CPC ....... *B29L 2031/085* (2013.01); *Y02E 10/721* (2013.01); *Y02P 70/523* (2015.11); *Y10T 29/4998* (2015.01); *Y10T 29/49998* (2015.01)

(56) References Cited

U.S. PATENT DOCUMENTS

| | | |
|---|---|---|
| 2011/0067795 A1 | 3/2011 | Hancock |
| 2011/0126978 A1 | 6/2011 | Gau |

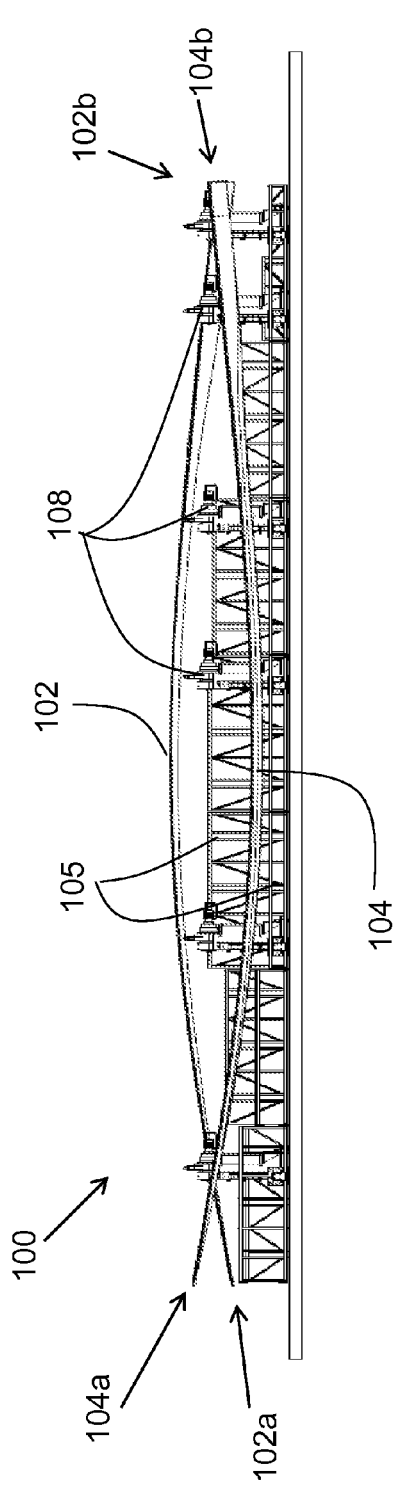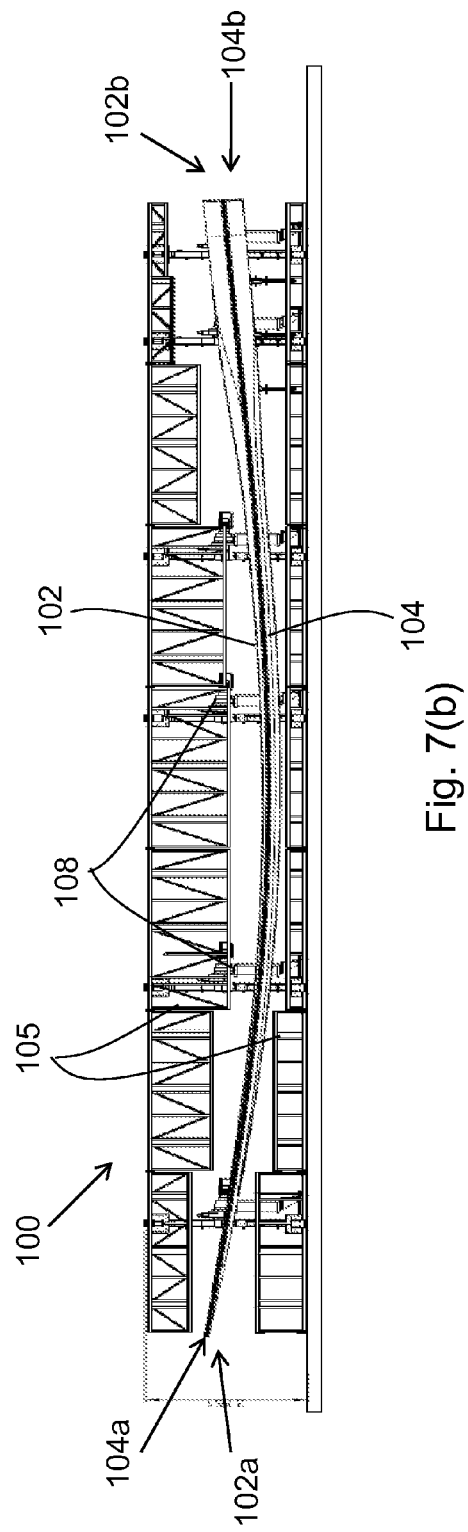
Fig. 7(a)
Fig. 7(b)

CRADLE FOR A WIND TURBINE BLADE

This is a National Phase Application filed under 35 U.S.C. 371 as a national stage of PCT/EP2013/051896, filed Jan. 31, 2013, and claims priority benefit from European Application No. 12153694.0, filed Feb. 2, 2012, and Great Britain Application No. 1222982.9, filed Dec. 20, 2012, the content of each of which is hereby incorporated by reference in its entirety.

FIELD OF THE INVENTION

The present invention relates to a cradle for supporting at least a section of a wind turbine blade and a method for receiving said section in said cradle. Furthermore, the invention relates to a post-moulding station using said cradle for use in the manufacture of a wind turbine blade, a method of manufacture of a wind turbine blade using such a post-moulding station, and a manufacturing system for a wind turbine blade including a post-moulding station.

BACKGROUND OF THE INVENTION

Wind turbine blades are normally manufactured as first and second blade shells, using a pair of adjacent blade moulds. The blade moulds comprise first and second moulding surfaces conforming to the upwind and downwind halves (or the suction and pressure sides) of a wind turbine blade, the first blade mould used to form a first blade shell and the second blade mould used to form a second blade shell, the shells subsequently joined together to form a wind turbine blade.

A fibrous composite material is initially layered on top of the first and second moulding surfaces, the layers of material conforming to the contours of the moulds to form the external aerodynamic surfaces of the blade shells. Once sufficient layers of the fibrous material have been applied in the moulds, a resin is applied to the fibrous material to cure the material, to allow it to harden. The resin is most commonly infused using a vacuum bag system, and takes approximately 2-3 hours from the start of resin infusion to a time when the blade shells are effectively cured to have a resilient structure.

Once the blade shells have sufficiently cured, the vacuum bags are removed and further operations can be performed on the hardened shells. For example, blade laminates and/or webs can be installed in the blade shells, various repair or patching operations may be carried out on the shells, grinding of shell surfaces, etc.

Next, an adhesive glue is applied to the edges of the shells while in the moulds. The blade moulds are linked via a hinged turning mechanism, and a first of the blade moulds, containing a first of the blade shells, is accordingly turned relative to the second mould and shell, such that the first shell is positioned above the second shell. This allows for the blade shells to be closed together along the edge of the shells, to form a complete wind turbine blade having an upwind and a downwind side. To allow for secure bonding of the shells together, a suitable pressure is maintained along the exterior surfaces of the blade shells by the blade moulds, usually for approximately 3-4 hours.

Once the complete wind turbine blade is fully adhered, the first blade mould may be hinged back to an open state, allowing access to the contained wind turbine blade. The blade can then be de-moulded from the second blade mould, and supported using blade carts to perform additional production operations, e.g. grinding of the external blade surface, coating, etc.

High-quality blade moulds are one of the most expensive pieces of equipment in the blade manufacturing process, requiring extensive tooling and manufacture before use to ensure accurate reproduction of desired blade profiles, as well as to allow for the turning of the moulds to bond blade shell parts together. In addition, even a minor difference in blade characteristics such as length, camber, etc. will in general require a completely new blade mould for the manufacturing process.

Blade moulds in use in current processes can cost approximately €1-3 million to manufacture and, dependent on where the moulds are made, extensive transportation time may be a factor before a new mould can be used at a manufacturing plant. This introduces considerable expense and lead time in the implementation of a manufacturing process for a new wind turbine blade.

Accordingly, one of the limitations to efficient implementation of wind turbine technology is the time required for the initial setup of a blade manufacturing system. A further limitation is the time taken for the manufacturing of individual blades within such a system.

It is an object of the invention to provide a system and a method of manufacture of a wind turbine blade which reduces these limitations.

SUMMARY OF THE INVENTION

Accordingly, there is provided a cradle for supporting at least a section of a wind turbine blade, the cradle comprising at least one array of support members extending between a first end and a second end of said cradle, wherein said support members comprise vacuum clamps arranged to receive a surface of said at least a section of a wind turbine blade.

The use of such a blade cradle allows for a flexible and reliable system for supporting a section of a wind turbine blade. The cradle may be provided as a substantially open-framed structure, allowing access to the surfaces of the supported wind turbine blade section, while supported in the cradle.

The vacuum clamps may be provided as suction cups arranged substantially in a line between the first end and the second end of the cradle. It will be understood that the section of a wind turbine blade may comprise a portion of a shell for a wind turbine blade, e.g. an upwind shell or a downwind shell, or the section may comprise a portion of a complete wind turbine blade, e.g. comprising both upwind and downwind surfaces. Additionally or alternatively, the section may comprise the entire longitudinal extent of the wind turbine blade section, e.g. from a root end to a tip end of the wind turbine blade, or the section may comprise a partial length of the blade itself, e.g. a root end section, a tip end section, a midboard section, etc. Preferably, the vacuum clamps are provided as suction cups, but any other suitable vacuum device may be used.

Preferably, the cradle comprises a cradle body, preferably an open-framed body, wherein said vacuum clamps are translationally moveable relative to said cradle body.

As the vacuum clamps are moveable relative to the cradle, the clamps can be accurately positioned to provide the best support for the section of the wind turbine blade received in the cradle. Additionally, the vacuum clamps can be moved while attached to the surface of the wind turbine blade section, allowing for the shape of the blade section to be adjusted while in the cradle. Accordingly, portions of the blade section can be pushed or pulled into a desired shape, allowing for a fine tuning of the profile of the section as required. Preferably, the vacuum clamps are coupled with at least one actuator to provide for said translational movement.

Preferably, said at least one array of support members is arranged in a line between the first end and the second end of the cradle, wherein said line is configured to substantially correspond to the location of a shear web in a section of a wind turbine blade to be received in said cradle.

By providing the support members along the length of the blade section corresponding to the location of the shear web for the blade section, the support members will be located at that point of the blade section best able to support the remainder of the blade section, and to absorb the forces involved in a distributed support bed provided by the discrete vacuum clamps of the cradle. The shear web may be provided by a single I-web or C-web arranged to extend between opposed upwind and downwind sections of a wind turbine blade, or by a cross-beam of a spar box received within the interior of a wind turbine blade. Additionally or alternatively, the support members may be arranged on the cradle along a line corresponding to the deepest portion of the wind turbine blade section or the line of maximum depth of the wind turbine blade section.

In one aspect, the cradle comprises first and second arrays of support members, wherein said first and second arrays are arranged in substantially parallel lines between the first end and the second end of the cradle, wherein said substantially parallel lines are arranged to extend along either side of a notional line corresponding to the location of a shear web in a section of a wind turbine blade to be received in said cradle.

Preferably, said cradle is arranged to selectively control the pressure applied by the vacuum clamps of said at least one array.

By controlling the vacuum pressure provided by the vacuum clamps, the attachment between the cradle and the blade section can be adjusted as required. This can allow for a better coupling between the cradle and the blade section, as the vacuum can be selectively applied and released by individual vacuum clamps in the cradle to allow for the blade section to settle into the cradle and ensure a solid fit between the clamps and the blade surface.

Preferably, said cradle is arranged to receive a section of a wind turbine blade comprising a portion of an upwind or a downwind section of a wind turbine blade, and wherein the cradle comprises at least one array of secondary support members extending between a first end and a second end of said cradle, wherein said at least one array of secondary support members are arranged to support a leading edge or a trailing edge of said section of a wind turbine blade.

Preferably, said secondary support members comprise vacuum clamps arranged to receive a surface of said at least a section of a wind turbine blade.

Preferably, said secondary support members are moveable relative to the cradle body, to provide for an adjustable cradle edge.

Such an adjustable edge of the cradle allows for different shapes of blade sections to be supported by the cradle edge, e.g. different wind turbine blade leading or trailing edge shapes.

Preferably, said at least one array of secondary support members is formed from a plurality of individual support modules, wherein said plurality of individual support modules are selectively removeable from said at least one array of secondary support members.

By providing removeable support members, accordingly direct access can be provided to individual sections of the leading edge or trailing edge of the wind turbine blade section. This allows for various manufacturing or repair operations to be carried out on the leading and trailing edges of the blade section, when supported in the cradle, e.g. a leading edge or trailing edge grinding operation. It will be understood that the at least one array of primary support members may additionally or alternatively be formed from a plurality of individual support modules which are individually removeable from said at least one array, to selectively provide access to those portions of the blade section supported by said array of primary support members.

Preferably, said support members comprise a support surface having at least one aperture defined thereon, wherein at least one vacuum clamp is moveably mounted within said at least one aperture, said at least one vacuum clamp linearly actuatable from a first recessed position where said at least one vacuum clamp is held within said at least one aperture, to a second projecting position wherein said at least one vacuum clamp projects out from said aperture, said at least one vacuum clamp standing proud of said support surface.

The vacuum clamps may be initially provided in a recessed position while the blade section is being received in the cradle, wherein the clamps are protected from damage by the presence of the support surface. Once the blade section is resting on the support surface, the vacuum clamps can be actuated to bear against the surface of the blade section, and the appropriate vacuum pressure applied to hold the blade section in place. It will be understood that the vacuum clamps may be moveable in any other direction relative to the cradle body, to allow for fine-tuning of the position of the vacuum clamps. Preferably, said support surface is formed from a cushioned or resilient material.

Preferably, the cradle further comprises at least one edge rail provided along at least a portion of a first side of said cradle, wherein said at least one edge rail is arranged to receive a blade processing tool for operation on at least a portion of a wind turbine blade section received in said cradle.

By providing a rail to receive a blade tool, the further processing of the blade section may be accomplished by an automated tool, which can run along said rail adjacent the surface of the supported blade section. Preferably, the rail is provided along the longitudinal direction of the blade section, but a rail or other suitable supporting system may be provided at the opposed first and second ends of the cradle, e.g. adjacent the root and tip ends of a cradle supporting an entire longitudinal extent of a wind turbine blade. The blade processing tool may comprise a leading edge or trailing edge grinding device, a blade root grinder, an adhesive application device, a spray device for the application of a coating to a surface of the blade section, etc.

In a preferred embodiment, the cradle comprises:
 a first array of secondary support members arranged to support a leading edge of said at least a section of a wind turbine blade;
 a second array of secondary support members arranged to support a trailing edge of said at least a section of a wind turbine blade; and
 at least one array of primary support members arranged to support a portion of said at least a section of a wind turbine blade between said leading edge and said trailing edge.

There is further provided a post-moulding station to receive an upwind wind turbine blade shell and a downwind wind turbine blade shell from a blade mould, the post-moulding station comprising first and second cradles as described above.

Preferably, said first and second cradles are hingedly coupled, wherein said first cradle is arranged to hinge relative to said second cradle to form a closed wind turbine blade cradle.

In a further aspect, there is also provided a method of receiving a section of wind turbine blade in a cradle as described above having an array of primary support members comprising vacuum clamps extending between a first end and a second end of said cradle, the method comprising the steps of:
  providing a first cradle to receive a section of a wind turbine blade;
  positioning a section of a wind turbine blade within said cradle such that a plurality of vacuum clamps bear against a surface of said section of a wind turbine blade; and
  applying a vacuum in said plurality of vacuum clamps to retain said section of a wind turbine blade in said cradle.
  Preferably, the method comprises the steps of:
  controlling the vacuum applied by individual vacuum clamps in said array to settle said section of a wind turbine blade in said cradle.
  Preferably, said step of controlling the vacuum comprises:
  dividing said array of vacuum clamps into a plurality of sets of vacuum clamps arranged in a numbered sequence between said first end and said second end;
  starting at the first end of said cradle, applying a vacuum to the adjacent first and second sets of vacuum clamps of said plurality of sets;
  releasing the vacuum in the first set of vacuum clamps of said plurality of sets to allow said wind turbine blade section to settle on the second set of vacuum clamps of said plurality of sets; and
  re-applying a vacuum in said first set of vacuum clamps;
wherein the controlling step further comprises:
  sequentially repeating the above steps of applying, releasing and re-applying a vacuum for adjacent sets of vacuum clamps in said array, from said first end to said second end, to allow the entire wind turbine blade section received in said cradle to settle on the entire array of vacuum clamps.

By cycling the vacuum applied by the individual clamps in this manner, the seating of the wind turbine blade section within the cradle is sequentially adjusted along the length of the cradle, until a solid and secure fit is achieved for each vacuum clamp in the array. It will be understood that a set of vacuum clamps within said array may comprise any number of vacuum clamps, e.g. each set may comprise a single vacuum clamp or a plurality of vacuum clamps.

Preferably, the method comprises the additional step of configuring the profile of the support members in the cradle by:
  adjusting the at least one array of support members to correspond to the profile of the blade mould master plug used to design the blade moulds used to form the section of wind turbine blade to be received in said cradle.
  Said configuring step is accomplished by lowering the blade mould master plug into the cradle, and adjusting the positioning of the at least one array of support members such that the support members bear against the surface of the blade mould master plug. Such a method provides for a relatively simple and accurate method of ensuring that the support members of the cradle are correctly aligned with the anticipated surface of the wind turbine blade section to be received in the cradle.

In addition, there is provided a method of manufacturing a wind turbine blade of at least 40 meters in length, the method comprising the steps of:
  curing at least a section of a first wind turbine blade shell in a first blade mould;
  curing at least a section of a second wind turbine blade shell in a second blade mould;
  transferring said first and second cured blade shells from said first and second blade moulds to a post-moulding station;
  closing said first and second cured blade shells to form a closed wind turbine blade shell, and
  bonding said first and second cured blade shells in said closed wind turbine blade shell to form a wind turbine blade.

Performing the closing operation away from the blade moulds allows for a greater utilisation efficiency of the relatively expensive blade moulds, thereby providing for a greater throughput of wind turbine blades manufactured according to the method.

Preferably, said closing step comprises the step of turning said first cured blade shell relative to said second cured blade shell in said post-moulding station to form a closed wind turbine blade shell, and wherein said step of bonding is performed on said closed wind turbine blade shell to form a wind turbine blade.

Preferably, the method comprises the step of performing at least one post-moulding operation on at least one of said first and second cured blade shells at said post-moulding station.

Additionally or alternatively, there is provided a method of manufacturing a wind turbine blade of at least 40 meters in length, the method comprising the steps of:
  curing a first wind turbine blade shell in a first blade mould;
  curing a second wind turbine blade shell in a second blade mould;
  transferring said first and second cured blade shells from said first and second blade moulds to a post-moulding station;
  performing at least one post-moulding operation on at least one of said first and second cured blade shells at said post-moulding station; and
  bonding said first cured blade shell with said second cured blade shell to form a wind turbine blade.

Providing a post-moulding station for use during the manufacturing process allows for operations to be performed on the blade shells after curing, away from the blade moulds, which allows for the blade moulds to be re-used relatively quickly. In one aspect, said bonding step is performed subsequent to said at least one post-moulding operation—this means that operations which are normally performed within the blade moulds (e.g. web installation, glue application, etc.) can be performed at the post-moulding station, freeing up the blade moulds at an earlier stage of the manufacturing process.

The term "cured blade shells" is used herein to refer to blade shells which have been substantially cured by the curing operation, preferably to a level where the blade shells can be handled without undergoing significant deformation of the shell structure. The duration of the curing operation performed will depend on the type of curing resin used in the manufacture of the blade shells, but may be of the order of 2-3 hours using standard resins. However, it will be understood that the blade shells may continue to undergo a curing process within the body of the blade shells for several hours after the denoted curing operation.

While the steps of the method may be performed on at least a section of a wind turbine blade shell which may be assembled with other shell sections to form a complete wind turbine blade shell, preferably the steps of the method are performed on a section of a wind turbine blade shell which corresponds to substantially an entire blade shell. In a preferred embodiment, the steps of the method are performed on a section of a blade shell corresponding to at least 50% of an entire wind turbine blade shell, further preferably at least 70%. In this case, the remainder of the entire wind turbine blade shell may be formed from separate dedicated blade sections, e.g. a dedicated blade root section and/or a dedicated blade tip section.

Preferably, said first wind turbine blade shell and said second wind turbine blade shell substantially form respective upwind and downwind blade shells.

The method of manufacture is used to manufacture a blade for a wind turbine in a quick and efficient manner, at a manufacturing location. In one embodiment, said post-moulding station is provided local to, preferably adjacent to the blade mould, to provide for a relatively short transfer distance between the blade mould and the post-moulding station. Further preferably, said bonding step is performed local to said post-moulding station, preferably using said post-moulding station.

In an alternative embodiment, the cured blade shells may be transported from the moulding location to a remote assembly location, for finishing and assembly using a post-moulding station.

Preferably, said wind turbine blade shells are load-bearing wind turbine blade shells.

It will be understood that said curing steps comprise curing said blade shells to a level wherein the shells may be handled and transferred from a blade mould to a separate post-moulding station without deformation. It will further be understood that subsequent curing of the blade shells may occur in the post-moulding station, or the blade shells may undergo a second curing operation after demoulding from the blade mould, e.g. in a dedicated curing oven.

In one aspect, there is provided a method of manufacturing a wind turbine blade of at least 40 meters in length, the blade comprising a profiled contour including a pressure side and a suction side, and a leading edge and a trailing edge with a chord having a chord length extending therebetween, the profiled contour, when being impacted by an incident airflow, generating a lift, the method comprising the steps of:
 curing a first wind turbine blade shell in a first blade mould, said first wind turbine blade shell comprising a body substantially forming a pressure side of a wind turbine blade having a leading edge and a trailing edge;
 curing a second wind turbine blade shell in a second blade mould, said second wind turbine blade shell comprising a body substantially forming a suction side of a wind turbine blade having a leading edge and a trailing edge;
 transferring at least one of said first and second cured blade shells, preferably both of said shells, from said first and second blade moulds to a post-moulding station;
 performing at least one post-moulding operation on at least one of said first and second cured blade shells at said post-moulding station; and
 subsequently bonding said first cured blade shell with said second cured blade shell to form a wind turbine blade.

Preferably, said at least one post-moulding operation is selected from one or more of the following: a blade shell repair operation, a blade shell grinding operation, a blade root flange coupling operation, a blade web installation operation, a gluing operation, a coating operation, an assembly operation to assemble at least two separate sections of a wind turbine blade shell to form a single wind turbine blade shell, a main laminate installation operation, an overlamination operation, installation of blade sensor systems, installation of blade lightning protection systems, a geometry check operation, a geometry adjustment operation to push or pull portions of the blade shell into position, a secondary curing operation in for example an oven, additions of external components, e.g. aero devices, fans, spoilers, stall fences, or any other suitable manufacturing or assembly operations, or any suitable non-destructive testing activity, e.g. wrinkle measurements, ultra sonic thickness measurement, phased array testing of glue bonds, etc.

Preferably, the post-moulding station comprises at least one blade cradle to receive a cured blade shell, and wherein said step of transferring comprises transferring said first cured blade shell to a first blade cradle and transferring said second cured blade shell to a second blade cradle.

Preferably, the method comprises the step of providing at least one of said first and second blade cradles as a substantially open-frame structure.

Providing at least one of the cradles as an open-framed structure allows that the at least one post-moulding operation may be performed on substantially any surface of a cured blade shell contained in the cradle. This allows for workers to easily access practically any part of the shell, to easily and effectively carry out operations which previously would be delayed until after the blade moulding process had carried out and the completed wind turbine blade removed from the blade moulds, e.g. grinding operations, coating, etc. Furthermore, as the cradles are provided to handle a substantially cured shell, there is a reduced need for 100% geometry support of the entire shell. As a consequence, the cradle does not have to be a stiff and strong component to provide complete support to every part of the shell surface, and thus can be formed of less rigid, lighter components and be of a reduced height—thereby reducing the height required during a possible turning operation of the cradle. The open-framed construction will be understood to relate to a structure which provides a non-continuous support surface to receive a portion of a shell for a wind turbine blade.

Additionally or alternatively, at least one of said first and second blade cradles comprises a plurality of support members to provide support to a surface of at least one of said first and second cured blade shells, and wherein the method comprises the step of removing at least one of said support members to provide access to a surface of at least one of said first and second cured blade shells, to facilitate said step of performing a post-moulding operation.

The use of removable support members allows for increased access to surfaces of the shells. The support members may be removed to provide direct access to that section of the surface initially supported by the support member in question. After the appropriate post-moulding operations are performed, the support member may be replaced in the cradles in question. It will be understood that this step may also be performed for any intra-bonding operations. It will be understood that the term "plurality" may refer to any suitable arrangement of a support surface to receive and support a portion of a blade shell, and which preferably may be moveable relative to the blade cradle. For example, a flexible support surface coupled to an array of moveable actuators may be provided, the actuators operable to adjust the shape of the flexible surface to bring sections of the flexible support surface into and out of contact with a portion of a supported blade shell, to provide access to the surfaces of said blade shell.

Preferably, said step of transferring comprises demoulding said first and second cured blade shells from said first and second blade moulds.

Preferably, said step of transferring comprises applying a vacuum lifting force to said first and second cured blade shells to demould said first and second cured blade shells.

Preferably, at least one of said first and second blade cradles comprises at least one vacuum clamp, and wherein said step of transferring comprises applying a vacuum clamping force to a surface of at least one of said first and second cured blade shells received within said at least one blade cradle, to retain said at least one blade shell within said at least one blade cradle.

The use of moveable vacuum clamps to secure the blade shells provides for a secure coupling mechanism which can be selectively applied with minimum additional worker operations.

Preferably, said at least one vacuum clamp is initially provided in a retracted position on said at least one blade cradle, and wherein said step of transferring comprises the step of advancing said at least one vacuum clamp from said retracted position to bear against a surface of said at least one blade shell to retain said at least one blade shell within said at least one blade cradle.

Preferably, the method comprises the step of retracting said vacuum clamp to said retracted position when it is desired to remove said at least one blade shell from said at least one blade cradle.

Preferably, said step of performing at least one post-moulding operation comprises applying an adhesive at a leading edge and a trailing edge of at least one of said first and second cured blade shells, and wherein said step of bonding comprises arranging said first and second cured blade shells to adhere the leading edge of the first blade shell to the leading edge of the second blade shell, and to adhere the trailing edge of the first blade shell to the trailing edge of the second blade shell.

It will be understood that the invention is not limited to a direct connection between the respective leading and trailing edges of the shells, e.g. a tail piece or insert may be positioned between the leading edges and/or trailing edges of the shells.

Preferably, said step of bonding comprises moving said first blade cradle containing said first cured blade shell relative to said second blade cradle containing said second cured blade shell, to close said first and second cured blade shells to form a wind turbine blade.

Preferably, said first blade cradle is hingedly coupled to said second blade cradle, and wherein the step of moving comprises hinging said first blade cradle or said second blade cradle to close said first and second cured blade shells.

The cradles may be further used as turning devices. As an alternative, there could be a separate station used for turning operations, wherein the blade shells are moved from the post-moulding station to the turning station after post-moulding operations are completed.

Preferably, the method further comprises the step of aligning said first cured blade shell with said second cured blade shell such that the leading edge and trailing edge of said first cured blade shell are in register with the respective leading edge and trailing edge of said second cured blade shell during said bonding step.

The cradles can be moved to adjust for over/under bites between the shells.

Preferably, said step of aligning comprises translationally moving at least one of said first and second blade cradles, preferably, relative to the other of said first and second blade cradles, to align the first and second cured blade shells contained within said first and second blade cradles.

The cradles are preferably positioned such that initially the leading edge side of said first blade shell is provided adjacent the leading edge side of said second blade shell. The step of moving (preferably hinging) is performed such that the trailing edge side of said first blade shell is brought into contact with the trailing edge side of said second blade shell.

Preferably, said first and second cured blade shells have a profiled contour dependent on the wind turbine blade to be manufactured, wherein at least one of said first and second blade cradles comprises a plurality of variable support members to support a surface of a blade shell to be received in said blade cradle, and wherein the method comprises the step of:

prior to said step of transferring, adjusting the variable support members of at least one of said first and second blade cradles based on the profiled contour of the blade shell to be received in said blade cradle.

This step provides for the adjustment of the support ribs/arms to accommodate the shell member to be received. This allows for the re-use of the cradles for different blade shell types/dimensions etc.

Preferably, said step of adjusting comprises varying said support members to present a support surface substantially conforming to the profiled contour of the blade shell to be received in said blade cradle.

Preferably, the post-moulding station is at least partly provided as a modular construction of a plurality of interchangeable station sub-modules, said sub-modules coupled together to form said post-moulding station, wherein the method comprises the steps of:

selecting a plurality of sub-modules based on a set of characteristics of the blade being manufactured, and
assembling the selected plurality of sub-modules to form said post-moulding station.

By providing a modular post-moulding station, the particular construction of station can be varied to accommodate the particular blade being manufactured. The characteristics of the blade being manufactured may include any combination of, but are not limited to: blade length, blade chord, blade camber, blade aerodynamic profile, blade shell thickness, etc.

It will be understood that the sub-modules may comprise structures having different lengths, widths, etc. Some sub-modules may be designed to receive different portions of a wind turbine blade shell, for example a section for receiving a root section of a blade shell may comprise a flange section for securing to the root end of the shell. A section for receiving a tip end may have a reduced width compared to a section for receiving a portion of the blade from towards the mid-point of the blade along the length of the blade shell, i.e. a portion having a longer chord length than the tip end of the shell.

Preferably, the method comprises the step of providing at least one of said first blade mould and said second blade mould as a substantially fixed mould. Preferably, the mould has substantially rigid foundations, e.g. concrete foundations.

Providing the blade moulds as fixed installations means that the moulds can be relatively easily produced, and mould costs can be kept relatively low.

Preferably, the method comprises the step of:
laying up a fibre-based material in an internal surface of a blade shell mould to form an uncured wind turbine blade shell.

The lay-up operation may be used for both of the first and second blade moulds, to form uncured first and second blade shells. The lay-up may be a manual or hand lay-up operation, or an automatic lay-up operation, e.g. spray lay-up, tape lay-up, fibre pultrusion, automotive lay-up of plies, etc.

Preferably, said step of curing comprises infusing said uncured wind turbine blade shell with a resin to cure the wind turbine blade shell. This infusion step may be an automatic or a manual process.

Preferably, the method further comprises, following said transferring step, iteratively repeating said steps of laying up and curing in said first and second blade moulds, to provide subsequent first and second cured blade shells.

By performing the next lay-up and curing operation using the moulds freed up by the step of transferring, the productivity rate of the moulds is greatly increased, as a new moulding operation can be performed as soon as the curing of the previous blade shells is completed. Accordingly, occupancy time of the blade moulds due to post-moulding operations is reduced, preferably eliminated, providing for a more efficient use of overall resources and equipment.

Preferably, the method further comprises iteratively repeating said step of transferring, to transfer said subsequent first and second cured blade shells to a post-moulding station.

The cured shells may be transferred to a new post moulding station, or may be transferred to the post moulding station used for the first pair of blade shells.

Preferably, the method further comprises iteratively repeating the steps of performing at least one post-moulding operation on at least one of said subsequent first and second cured blade shells at said post-moulding station, and bonding said subsequent first and second cured blade shells to form a wind turbine blade.

The transferring of cured shells to the post moulding station for subsequent post-moulding operations allows for a streamlining of the blade production process, as the effectiveness of the individual manufacturing components, i.e. the blade moulds and the post moulding stations, is maximized. Such a system allows for the use of low-cost blade moulds, which may be easily manufactured and replaced if necessary.

Relating to the step of bonding, preferably, the method further comprises the step of performing at least one intra-bonding operation on at least one of said blade shells in at least one of said first and second blade cradles, during the step of bonding said first cured blade shell with said second cured blade shell to form a wind turbine blade.

Some operations may be performed while the adhesive between the shells is setting. Preferably this is accomplished through use of open-frame cradle structures.

Preferably, said at least one intra-bonding operation is selected from one or more of the following: a blade shell repair operation, a surface grinding operation, a coating operation, a blade root flange finishing operation.

Relating to the steps of curing, preferably the method further comprises the step of performing at least one intra-curing operation on at least one of said blade shells in at least one of said moulds, during the step of curing said blade shell.

Some operations may be performed while the blade is curing in the mould, if the shell requires additional time to cure.

Preferably, said at least one intra-curing operation is selected from one or more of the following: a grinding operation, a blade shell repair operation.

Further relating to the step of bonding, preferably the method further comprises the step of performing at least one post-bonding operation on at least one of said blade shells in at least one of said moulds, subsequent to said bonding step.

Preferably, said at least one post-bonding operation is selected from one or more of the following: a leading edge grinding operation, wherein the leading edge surface of the bonded wind turbine blade is grinded to a smooth surface; a trailing edge grinding operation, wherein the trailing edge surface of the bonded wind turbine blade is grinded to a smooth surface; a blade repair operation, wherein a defect in the blade surface may be corrected, e.g. by applying a filler material; a coating operation, wherein at least one layer of gel coat or erosion resistant material or tape is applied to the external surface of the bonded wind turbine blade.

In another aspect of the invention, there is provided a method of manufacturing a wind turbine blade comprising the steps of:
curing a wind turbine blade shell in a mould
transferring the cured blade shell from the mould to a post-moulding station;
performing at least one post-moulding operation on the cured blade shell at said post-moulding station; and
subsequently bonding said cured blade shell with a second cured blade shell to form a wind turbine blade.

There is also provided a post-moulding station for performing at least one post-moulding operation on at least a section of a cured wind turbine blade shell of at least 40 meters length, the post-moulding station for use in the manufacture of a wind turbine blade, preferably in the method described above, and comprising:
at least one cradle to receive at least a section of a cured wind turbine blade shell transferred from a blade mould,
wherein at least one post-moulding operation can be performed on at least one surface of said cured wind turbine blade shell received in said cradle.

By providing a cradle to receive a cured blade shell which is removed from a blade mould, this frees up the blade mould to be used for a subsequent lay-up and moulding operation. This increases the productivity of a single blade mould, and means that post-moulding operations can be performed outside of the mould. Preferably, the post-moulding station is operable to receive an entire blade shell, but it will be understood that the post-moulding station may receive a plurality of sections of a blade shell to be assembled to form a single blade shell, or alternatively, individual sections of a blade shell may be supported by individual post-moulding sections, for assembly into a single blade shell.

Preferably, said post-moulding station comprises a first cradle to receive a first cured blade shell and a second cradle to receive a second cured blade shell, said first and second cured blade shells together substantially forming a wind turbine blade.

Providing two cradles at the post-moulding station allows for post-moulding operations to be performed at the same time on the shells forming a wind turbine blade. Preferably, one of the cradles is arranged to receive a pressure side shell of a wind turbine blade, with the other cradle arranged to receive a suction side shell of a wind turbine blade.

Preferably, the post-moulding station further comprises a closing mechanism operable to move said first cradle having a first cured blade shell relative to said second cradle having a second cured blade shell to form a closed cradle, such that said first cured blade shell may be joined to said second cured blade shell within said closed cradle to form a wind turbine blade.

Providing a closing mechanism at the post-moulding station means that the closing operation can be performed away from the blade moulds. This means that blade moulds of relatively simple construction can be used in the manufacturing process, e.g. moulds which are fixed to a floor surface using a concrete foundation. It will be understood that either of the first or second cradles may be the hingedly moved cradle, preferably said first cradle.

Preferably, said first cradle is hingedly coupled to said second cradle, wherein said closing mechanism is operable to hinge said first cradle relative to said second cradle.

Preferably, said first cradle is translationally moveable relative to said second cradle when said first and second cradles are closed, to align a first cured blade shell with a second cured blade shell within said closed cradle to form a wind turbine blade.

As the cradles can be moved relative to one another when in the closed position, this allows for the correction of any over- or under-bite misalignment between the edges of the cured blade shells contained in the cradles, e.g. as a result of manufacturing variances and/or post-moulding station alignment. It will be understood that either of said first or second cradles may be moveable relative to each other.

Preferably, said cured blade shells are received in said cradles with the internal surfaces of said shells facing upwards. Preferably, said post-moulding station is configured such that the first and second cradles are positioned adjacent each other. Accordingly, a hinging operation of one cradle with respect to the other provides an effective method of closing for the contained blade shells.

Preferably, said at least one post-moulding operation comprises applying an adhesive to at least one of said first and second cured blade shells, and wherein said closing mechanism is operable to move said first cradle relative to said second cradle to bond said first cured blade shell to said second cured blade shell to form a wind turbine blade.

As the closing operation can be performed at the post-moulding station, the cradles provide the optimum location for the gluing operation to apply adhesive to one or both of the contained blade shells.

Preferably, said first and second cradles are arranged to apply a bonding pressure to said first and second cured blade shells when said first and second cradles are closed.

As the bonding of the shells may require the application of a bonding pressure to the shells to be bonded, the post-moulding station may be arranged to force the shells together to produce an effective bonding of the shells. Preferably, at least one of said cradles comprises a pressure member extending along substantially the length of said cradle. Preferably, said pressure member is operable to apply a pressure along a portion of the length of a cured blade shell received within said cradle. Preferably, said pressure member is operable to apply a bonding pressure along an edge of a cured blade shell received within said cradle.

Additionally or alternatively, said at least one post-moulding operation is selected from one or more of the following: a blade shell repair operation, a blade shell grinding operation, a blade web installation operation, a gluing operation, a coating operation.

Preferably, said at least one cradle is a substantially open-framed structure having a plurality of support members to support a surface of a cured wind turbine blade shell received in said cradle.

The use of an open-framed structure as the cradle allows that post-moulding operations may be performed on substantially any surface of a cured blade shell contained in the cradle. This allows for workers to easily access practically any part of the shell, to easily and effectively carry out operations which previously would be delayed until after the blade moulding process had carried out and the completed wind turbine blade removed from the blade moulds, e.g. grinding operations, coating, etc.

Preferably, at least one of said plurality of support members is moveable relative to a cured blade shell received in said cradle, preferably removable, to provide access to a supported surface of a cured blade shell received in said cradle.

The support members may be adjusted, moved or removed to provide direct access to that section of the surface initially supported by the support member in question. After the appropriate post-moulding operations are performed, the support member may be replaced or returned to position in the cradles in question.

Preferably, at least one of said plurality of support members is adjustable such that the geometry of a support surface presented by said plurality of support members is variable to accommodate cured blade shells having different/diverse shell profiles.

As the support members can be adjusted, this allows for a configurable cradle which can support different types of cured blade shells. Accordingly, such a cradle can be re-used in manufacturing processes for differently shaped wind turbine blades.

Preferably, said plurality of support members comprise at least one vacuum clamp device operable to apply a vacuum against a portion of the surface of a cured blade shell received in said cradle, to secure said cured blade shell within said cradle.

Vacuum clamps provide a simple and controllable mechanism for securing a blade shell within a cradle. It will be understood that the clamps are operable to retain a shell within the cradle during possible movement of the cradle, e.g. hinging motion and/or rotational motion.

Preferably, said at least one vacuum clamp is movably mounted on said plurality of support members, said at least one vacuum clamp operable to move between a first retracted position wherein said at least one vacuum clamp is spaced from the surface of a cured blade shell received in said cradle, and a second advanced position wherein said at least on vacuum clamp abuts a surface of said cured blade shell received in said cradle.

By moving the vacuum clamps between positions, it is possible to selectively apply a clamping force to a blade shell, while preventing damage to the clamps and/or the blade shell during positioning of the shell in the cradle, or subsequent removal.

Preferably, said at least one vacuum clamp is operable to engage with a surface of a blade shell received within said cradle, said vacuum clamp moveable to push and/or pull a portion of said surface of said blade shell to an adjusted position.

The securing of the vacuum clamps against the surfaces of the shells allows for minor adjustments to be made to the shell surfaces, e.g. to correct minor errors in local geometry.

Preferably, said cured wind turbine blade shell comprises a profiled shell body having a leading edge side and a trailing edge side, and wherein said post-moulding station comprises a first array of support members arranged to support a cured blade shell at the leading edge side of the profiled shell body and a second array of support members arranged to support a cured blade shell at the trailing edge side of the profiled shell body.

Providing support members or arms at the leading and trailing edges provides for an optimised and effective support of the cured blade shell within the cradle. Furthermore, such an arrangement of support members can aim in the application of a bonding pressure to the edges of the blade shells when closing a pair of blade shells to form a wind turbine blade.

Preferably, said post-moulding station comprises a third array of support members arranged to support a cured blade shell at a point between the leading edge side and the trailing edge side of the profiled shell body.

Preferably, said third array of support members are arranged to support the deepest section of the profiled shell body between the leading edge side and the trailing edge side of the profiled shell body. Preferably, the third array of support members are provided along a line corresponding to the line of maximum thickness or camber of a wind turbine blade formed by said cured blade shell.

Preferably, said first and/or second arrays of support members are moveable to allow access to the leading and/or trailing edge sides of a profiled shell body received within the cradle.

By moving the first or second arrays, access is provided to the edges of the shells and the wind turbine blade, allowing for operations to be performed directly on these edges, e.g. a grinding operation. It will be understood that individual support members of the first and second arrays may be individually moveable, to provide access to a localized section of the leading and/or trailing edge sides of the contained shell body.

Preferably, said at least one cradle comprises a root flange clamping mechanism, said root flange clamping mechanism arranged to couple with a blade root flange of a cured blade shell to be received within said at least one cradle.

The cradle root flange clamping mechanism provides for a mounting point for a blade shell received within the cradle. As the blade root flange of the shell is effectively designed to support the weight of the blade shell body, it provides a useful initial securing point for positioning the shell in the cradle. Furthermore, as the position of the root flange is defined in the cradle, it can be used to align a received blade shell with respect to the other support surfaces of the cradle.

Preferably, said at least one cradle is formed by a plurality of cradle sub-modules.

A modular construction of cradle allows for the characteristics of the cradle (which are determined by the characteristics of the blade shell to be received in the cradle) to be varied through selection of appropriate sub-modules, e.g. cradle length, root end width, cradle width, etc.

Preferably, said plurality of sub-modules are selected based on the characteristics of a cured blade shell to be received within said at least one cradle.

Preferably, said plurality of sub-modules are selected from a range of sub-modules having alternative sub-module dimensions.

Preferably, said plurality of cradle sub-modules comprise a root end sub-module arranged to support a root end of a cured blade shell, a tip end sub-module arranged to support a tip end of a cured blade shell, and at least one intermediate sub-module arranged to support a portion of a cured blade shell between said root end and said tip end.

It will be understood that the different types of sub-modules may have different characteristics, e.g. a tip end module may have a greater or lesser height to accommodate a tip end of a pre-bent blade (dependent on the direction of bending), a root end module may be provided with a connection for coupling to a root flange, etc.

Preferably, said post-moulding station further comprises at least one support rail which extends along at least a portion of the length of said post-moulding station adjacent said at least one cradle, said support rail operable to receive a tool for performing a post-moulding operation on a cured blade shell received in said at least one cradle.

The use of a support rail allows for improved ease of mounting manufacturing equipment at the location of the blade shell to be worked upon. Providing a secure mounting location can improve the safety aspects of the process, as well as facilitating automated operations by presenting a configurable platform which can be used as a guide for movement of a tool with respect to an adjacent blade shell.

Preferably, said post-moulding station further comprises at least one tool, wherein said tool is moveable along said rail to perform a post-moulding operation along at least a portion of the length of a cured blade shell received in said cradle.

The tool may comprise a grinding device, a glue applicator device, a spray coating device, etc. The tool may be remotely controllable. In a further embodiment, said rail is operable to receive a tool to perform an intra-bonding or a post-bonding operation on a wind turbine blade formed by first and second blade shells.

In a further embodiment, at least one cradle is rotatable about a central longitudinal axis of said cradle.

By providing a rotatable cradle, access to different sections of a contained blade shell may be improved by rotating the cradle and contained shell.

Additionally or alternatively, said post moulding station comprises a first cradle to receive a first cured blade shell and a second cradle to receive a second cured blade shell, said first and second cradles operable to close to form a wind turbine blade from said first and second shells, wherein said first and second cradles are rotatable when closed about a central longitudinal axis of said closed first and second cradles.

A single cradle may be rotatable about its own longitudinal axis. Additionally or alternatively, the entire post-moulding station and/or the first and second cradles may be rotatable about a longitudinal axis when the cradles are closed, to allow for rotation of the wind turbine blade formed from first and second blade shells as the shells are being bonded together in the closed cradles.

There is also provided a manufacturing system for the manufacture of wind turbine blades formed from a pair of cured blade shells bonded together, the system comprising:
a first upwind blade mould to produce at least a portion of a first upwind cured blade shell;
a second downwind blade mould to produce at least a portion of a second downwind cured blade shell;
a post-moulding station to receive said at least a portion of said first and second cured blade shells from said first and second blade moulds, wherein a post-moulding operation can be performed on said first and second cured blade shells at said post-moulding station; and
a closing mechanism operable to close first and second cured blade shells to form a wind turbine blade.

The use of such a manufacturing system provides for a relatively quick and efficient manufacture of wind turbine blade, allowing for maximum effective blade mould usage.

The closing mechanism is operable to bond said first and second blade shells together, to form a wind turbine blade having an upwind and a downwind section. In one embodiment, said post-moulding station is local to said first and second blade moulds. Alternatively, said post-moulding station is remote from said first and second blade moulds.

In a preferred aspect of the invention, an entire blade shell is moulded using a single blade mould. In an alternative aspect, the blade shells may be moulded as individual sections with each section manufactured in a separate blade mould for later assembly.

Preferably, said post-moulding station comprises said closing mechanism.

Preferably, said post-moulding station comprises first and second blade cradles operable to receive said first and second cured blade shells.

Preferably, the system further comprises a lifting device operable to demould or remove said first and second cured blade shells from said first and second blade moulds. Preferably, said lifting device is further operable to transfer said first and second cured blade shells to said post-moulding station.

Preferably, said first and second blade moulds are used in a lay-up process of a fibrous composite material to produce said first and second cured blade shells. Preferably, said manufacturing system further comprises an infusion mechanism operable to infuse said fibrous composite material with a resin to cure said fibrous composite material to form said first and second cured blade shells.

Preferably, said post-moulding station comprises a plurality of support modules to receive individual sections of said first and second cured blade shells for assembly to form said first and second cured blade shells, Said support modules may comprise individual supports for separate root sections, tip sections, and/or aerodynamic sections of individual blade shells.

Preferably, said post-moulding station comprises a post-moulding station as described above.

There is further provided a wind turbine blade manufactured using the system and method described above.

DESCRIPTION OF THE INVENTION

An embodiment of the invention will now be described, by way of example only, with reference to the accompanying drawings, in which:

FIG. 7(a) is a side view of the post-moulding station of FIG. 5 when in an open state;

FIG. 7(b) is a side view of the post-moulding station of FIG. 5 when in a closed state;

Figure 1:
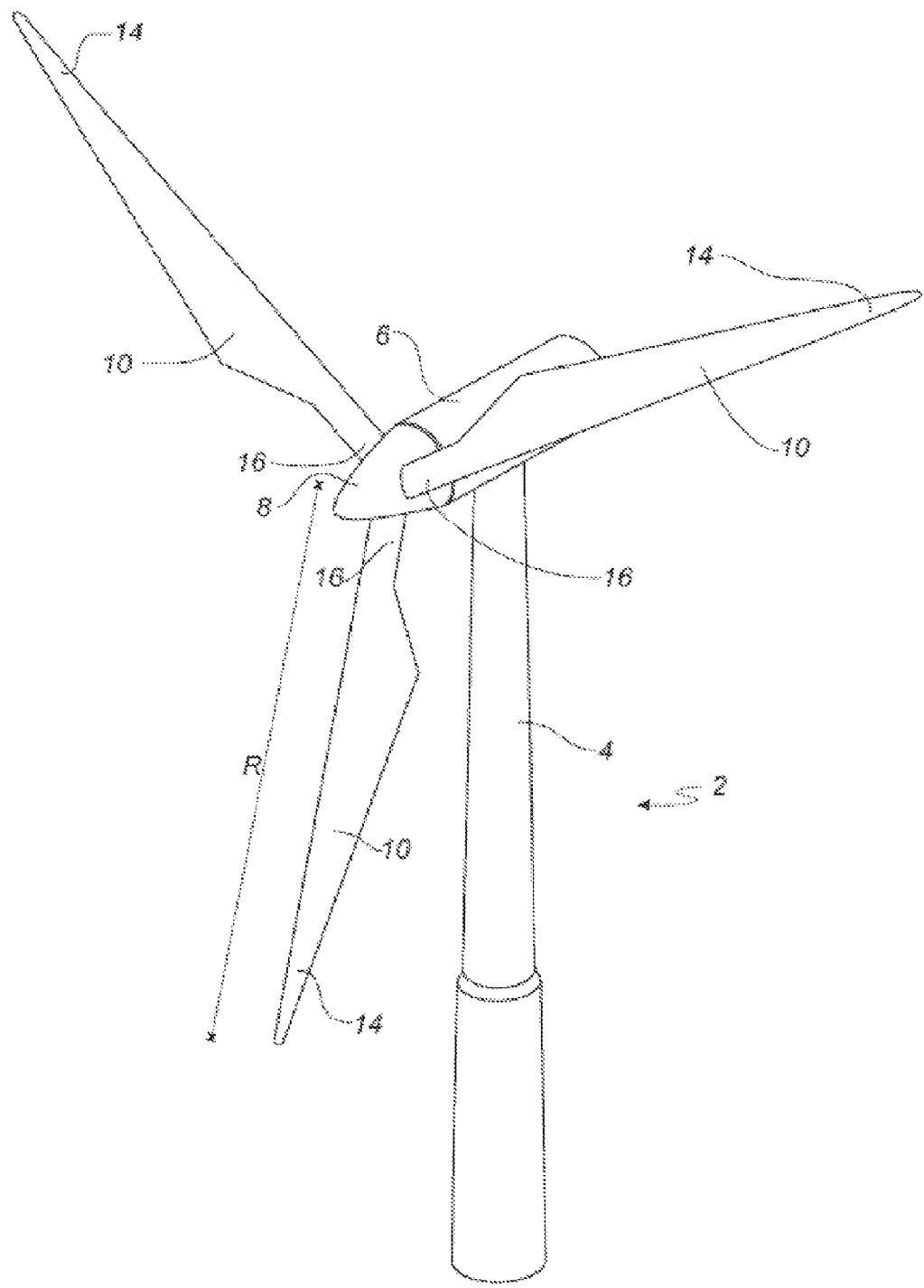
FIG. 1 shows a wind turbine.

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8. The rotor has a radius denoted R. While a three-bladed upwind wind turbine design is presented here, it will be understood that the invention may equally apply to blades of other wind turbine designs, e.g. two-bladed, downwind, etc.

Figure 2:
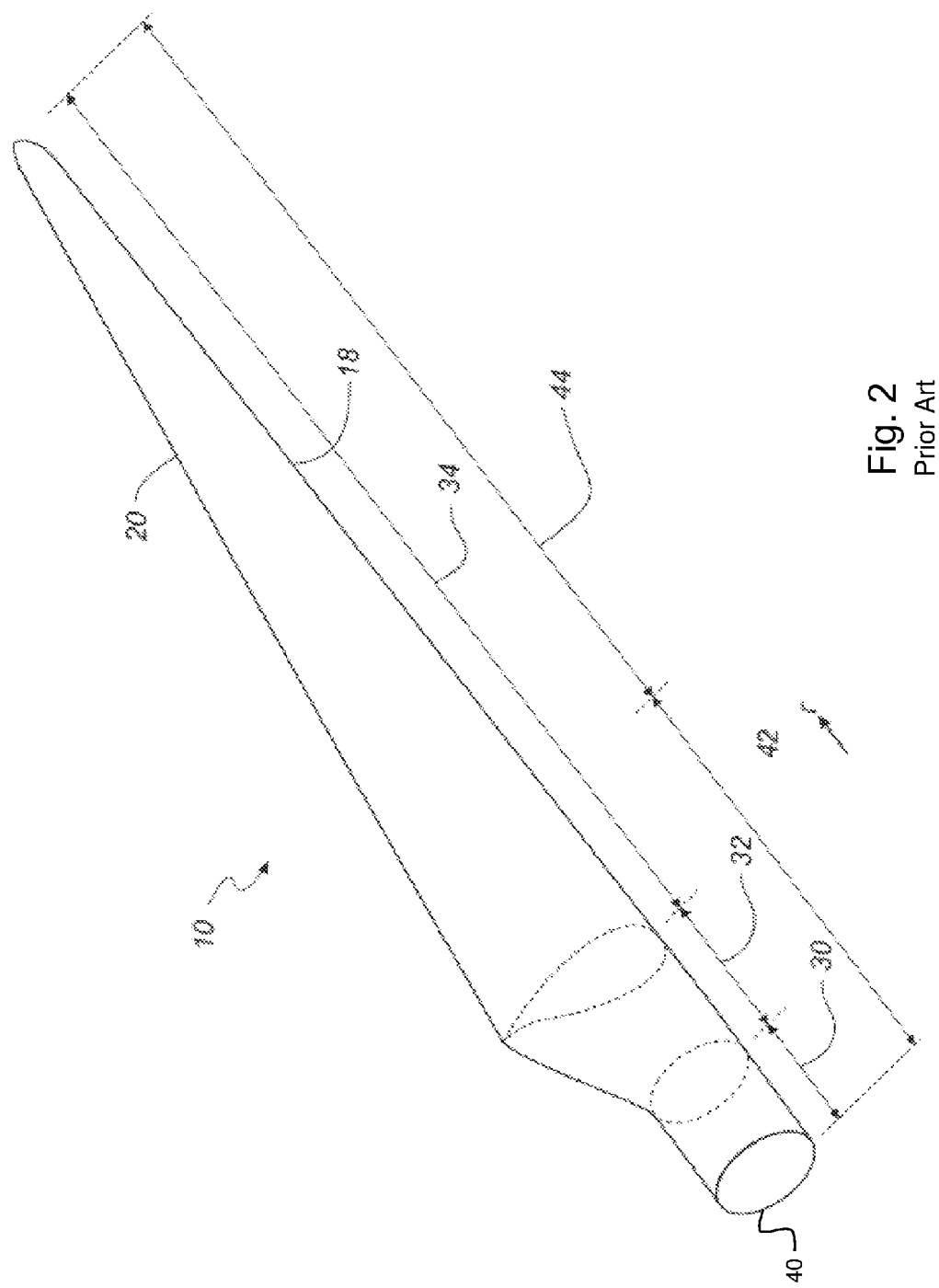
FIG. 2 shows a schematic view of a wind turbine blade.

FIG. 2 shows a schematic view of a first embodiment of a wind turbine blade 10 according to an embodiment of the invention. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 is typically constant along the entire root area 30. The transition region 32 has a transitional profile 42 gradually changing from the circular or elliptical shape 40 of the root region 30 to the airfoil profile 50 of the airfoil region 34. The chord length of the transition region 32 typically increases substantially linearly with increasing distance r from the hub.

The airfoil region 34 has an airfoil profile 50 with a chord extending between the leading edge 18 and the trailing edge 20 of the blade 10. The width of the chord decreases with increasing distance r from the hub.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

Figure 3:
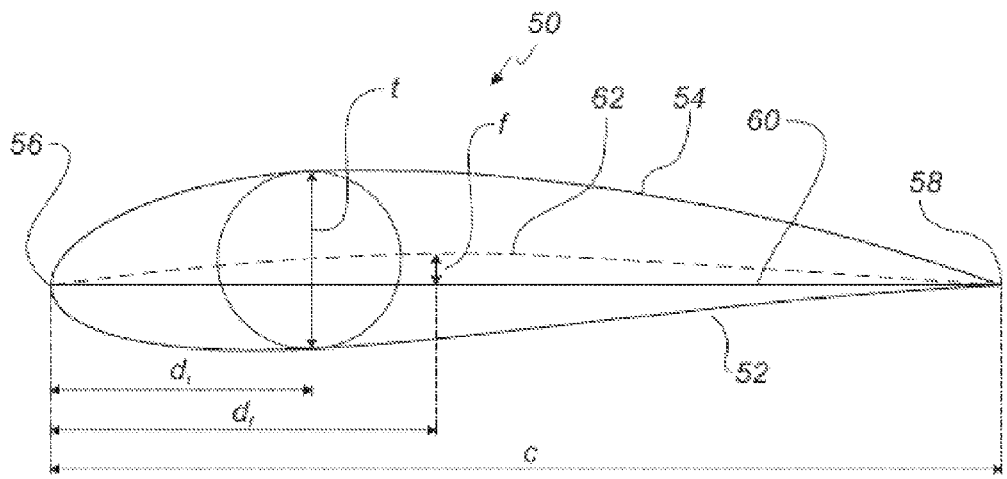
FIG. 3 shows a schematic view of an airfoil profile of the blade of FIG. 2.

FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally face towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber and lower camber, which are defined as the distances from the chord 60 and the suction side 54 and pressure side 52, respectively.

Airfoil profiles are often characterised by the following parameters: the chord length c, the maximum camber f, the position df of the maximum camber f, the maximum airfoil thickness t, which is the largest diameter of the inscribed circles along the median camber line 62, the position dt of the maximum thickness t, and a nose radius (not shown). These parameters are typically defined as ratios to the chord length c.

The wind turbine blades may further comprise pre-bent blades, wherein the body of the blade is designed having a bend or curve, preferably in the direction of the pressure side of the blade. Pre-bent blades are designed to flex during operation of the wind turbine, such that the blades straighten under the effect of optimum wind speed at the wind turbine. Such a pre-bent blade will provide improved performance during wind turbine operation, resulting in numerous advantages, e.g. tower clearance, swept area, blade weight, etc.

One way of constructing a wind turbine blade 10 comprises forming the blade 10 as two separate shell pieces—a first piece which substantially forms the pressure or upwind side 52 of the blade 10, and a second piece which substantially forms the suction or downwind side 54 of the blade 10. Such shell pieces are normally formed in separate open blade moulds conforming to the aerodynamic shapes of the respective sides, and are subsequently joined together by closing the blade moulds to form a wind turbine blade 10.

It will be understood that the invention may apply for the manufacture and/or handling of straight blades or of pre-bent blades.

Figure 4:
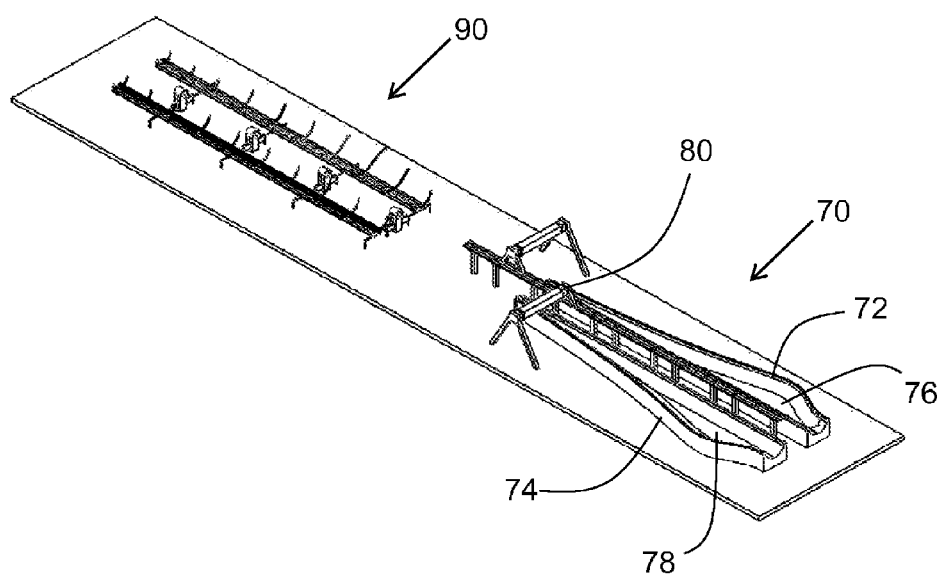
FIG. 4 illustrates an embodiment of a manufacturing process for a wind turbine blade according to the invention.

An embodiment of a manufacturing system for a wind turbine blade comprising a cradle according to the invention is illustrated in FIG. 4. The manufacturing system comprises a blade moulding station (indicated at 70) and a post-moulding station (indicated at 90). The blade moulding station 70 comprises a set of first and second blade shell moulds 72,74. The blade moulds comprise respective first and second internal surfaces 76,78 which are arranged to produce first and second shaped blade shells having an aerodynamic profile substantially corresponding to respective upwind (or pressure side) and downwind (or suction side) halves of a wind turbine blade.

During manufacture of a wind turbine blade, a lay-up operation is performed at the blade moulding station 70, wherein a plurality of layers of a preferably fibre-based composite material are applied to the internal surfaces 76,78 of the blade moulds 72,74. The fibre layers are applied to conform to the mould shape, and may be arranged at various thicknesses or densities dependent on the structural requirements of the wind turbine blade to be manufactured.

In the embodiment shown in FIG. 4, the blade moulding station 70 is provided with an automatic fibre lay-up apparatus 80, which allows for machine-controlled lay-up of the layers of fibre-based material in the blade moulds 72,74. The automatic fibre lay-up apparatus comprises at least one fibre applicator device suspended on a moveable gantry provided above the blade moulds 72,74, the at least one fibre applicator device operable to move along the length of the blade moulds 72,74 to apply fibre layers, e.g. fibre tape, to the internal surfaces 76,78 of the blade moulds 72,74.

However, it will be understood that the manufacturing system of the invention may be implemented using any suitable lay-up mechanism, e.g. hand lay-up. Furthermore, the lay-up operation may comprise the use of pultruded elements or pre-pregs of composite material within the blade moulds, either as an alternative to or in addition to the layers of fibre-based material.

Once sufficient layers of the fibre-based material have been applied to the surfaces of the moulds 72,74, a curing operation is then performed to cure the fibre layers to a relatively hardened state. In one embodiment, this may comprise applying a cover or vacuum bag over the fibre layers to form a container, and subsequently applying a vacuum pressure to the interior of the container defined by the vacuum bag and the surface of the blade mould 72,74.

A curing resin is then infused or injected into the interior of the container, the resin spreading throughout the fibre layers by the action of the vacuum pressure. The resin is then allowed to cure and accordingly harden and join the layers of fibre-based material into a blade shell (not shown), having a structural profile corresponding to the shape of the surface of the blade moulds 72,74.

The term "cured blade shells" is used herein to refer to blade shells which have been substantially cured by the curing operation, preferably to a level where the blade shells can be handled without undergoing significant deformation of the shell structure. The duration of the curing operation performed will depend on the type of curing resin used in the manufacture of the blade shells, but may be of the order of 2-3 hours using standard resins. However, it will be understood that the blade shells themselves may continue to undergo a curing process within the body of the blade shells for several hours after the denoted curing operation.

Accordingly, once the blade shells have substantially cured, the associated cover or vacuum bag may be removed, and the cured blade shells can be demoulded from the blade moulds 72,74. To demould the blade shells, any manufacturing equipment which may be provided above the blade moulds 72,74, e.g. automatic fibre applicator device 80, may be removed, and a lifting apparatus (not shown) may be positioned above the blade shells contained in the blade moulds 72,74. The lifting apparatus is operable to lift the cured blade shells out of the blade moulds 72,74, and to transfer the cured blade shells to the post-moulding station 90, where additional post-moulding operations may be performed.

It will be understood that the transferring operation may be performed using any suitable lifting apparatus for the transferral of a wind turbine blade shell, e.g. a vacuum lifting device, a crane, a manual lifting operation, etc.

Examples of post-moulding operations which can be performed at the post-moulding station 90 on the blade shells can include, but are not limited to: a blade shell repair operation, involving a repair of any minor defects in a cured blade shell; a blade shell cutting or grinding operation, wherein a portion of a surface of the cured blade shell can be cut away or ground to present a relatively smooth profile; a blade root flange coupling operation, wherein a pair of blade root flanges which are provided on first and second blade shells are coupled together to form a single integral blade root flange; a gluing operation, wherein an adhesive is applied to a surface of a blade shell to bond components or blade shells together; a coating operation, wherein an external surface of a blade shell is coated with a coating layer, e.g. a gel coat or suitable erosion resistant material; a laminate installation operation, wherein a main laminate or other element of the interior of a wind turbine blade may be fixed to an internal surface of one of the blade shells for positioning in the interior of a wind turbine blade; an overlamination operation; installation of internal blade components, e.g. load or deflection monitoring sensors, lightning protection systems, etc.; a survey of blade shell geometry; a secondary curing operation in, for example, an oven; or any other suitable manufacturing or assembly operations.

As a result of performing these post-moulding operations at the post-moulding station 90, the blade moulds 72,74 are now released from the production time associated with the above post-moulding operations, which traditionally have been performed with the blade shells retained in the blade moulds 72,74. Accordingly, the use of a post-moulding station 90 to receive blade shells from a blade moulding station allows for the blade moulds 72,74 to be freed up for a subsequent lay-up operation once the curing and transferring of the blade shells has been completed, and provides for reduced occupancy time of the blade moulds 72,74 by the components of a single wind turbine blade. This acts to increase the productivity of a single set of blade moulds 72,74, and provides for greater flexibility in the manufacturing process.

In the embodiment of FIG. 4, the post-moulding station comprises an open-ribbed cradle structure to receive a cured blade shell from a blade moulding station, and to support said cured blade shells during post-moulding operations. With reference to FIGS. 5-8, a more detailed view is provided of an alternate embodiment of a post-moulding station 100 according to the invention.

The post-moulding station 100 of FIGS. 5-8 comprises first and second blade shell cradles 102,104 which are arranged to receive a cured blade shell after demoulding from a blade mould 72,74. The cradles 102,104 comprise substantially open-framed structures or cradle bodies 105 having respective tip ends 102a,102b and root ends 102b, 104b, the open-framed structures 105 having a plurality of support members 106 provided thereon to support the external surfaces of the cured blade shells.

The first blade cradle 102 is arranged to receive a first cured blade shell corresponding to an upwind or pressure side blade shell, and the second blade cradle 104 is arranged to receive a second cured blade shell corresponding to a downwind or suction side blade shell, wherein the support members 106 are configured to present a support arrangement appropriate for the characteristic dimensions of the blade shells, e.g. blade length, blade camber on the upwind and downwind surfaces, transition zones in the aerodynamic profile between different blade sections, etc. While the cradles 102,104 are illustrated as two parts of a single post-moulding station 100, it will be understood that the cradles 102,104 may be provided as separate entities used for the support and handling or individual blade sections or of an entire wind turbine blade.

Figure 8A:
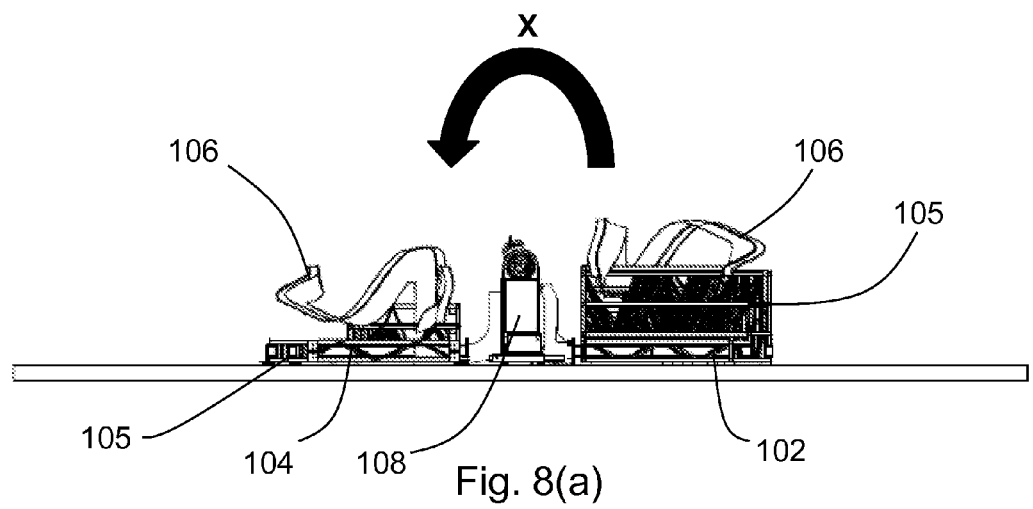
FIG. 8(a) is an end view of the post-moulding station of FIG. 5 when in an open state.
Figure 8B:
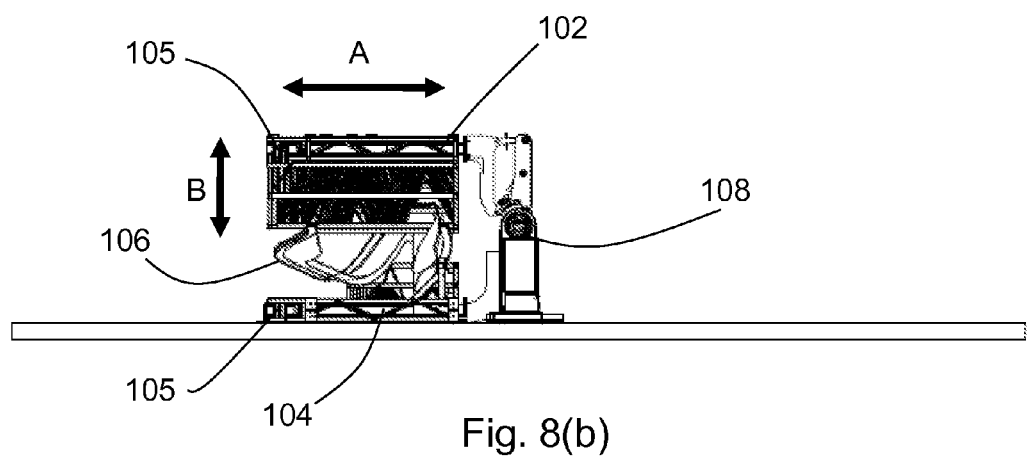
FIG. 8(b) is an end view of the post-moulding station of FIG. 5 when in a closed state.

The first and second cradles 102,104 are arranged in a parallel longitudinal relationship, the first cradle 102 coupled to the second cradle 104 via a plurality of hinging mechanisms 108. With reference to FIGS. 7 and 8, the first cradle 102 is arranged to be hinged relative to the second cradle 104, as indicated by the arrow X shown in FIG. 8(b), such that the first cradle 102 is positioned above the second cradle 104 to form a closed post-moulding station 100, as seen in FIGS. 7(b) and 8(b). The post-moulding station 100 is further operable to translationally move the first cradle 102 relative to the second cradle 104 when in the closed position, in order to correct the alignment between the first and second cradles 102,104, as indicated by the arrows A and B in FIG. 8(b). The first cradle 102 may be moveable along the horizontal and/or vertical axis with respect to the second cradle 104.

Figure 5:
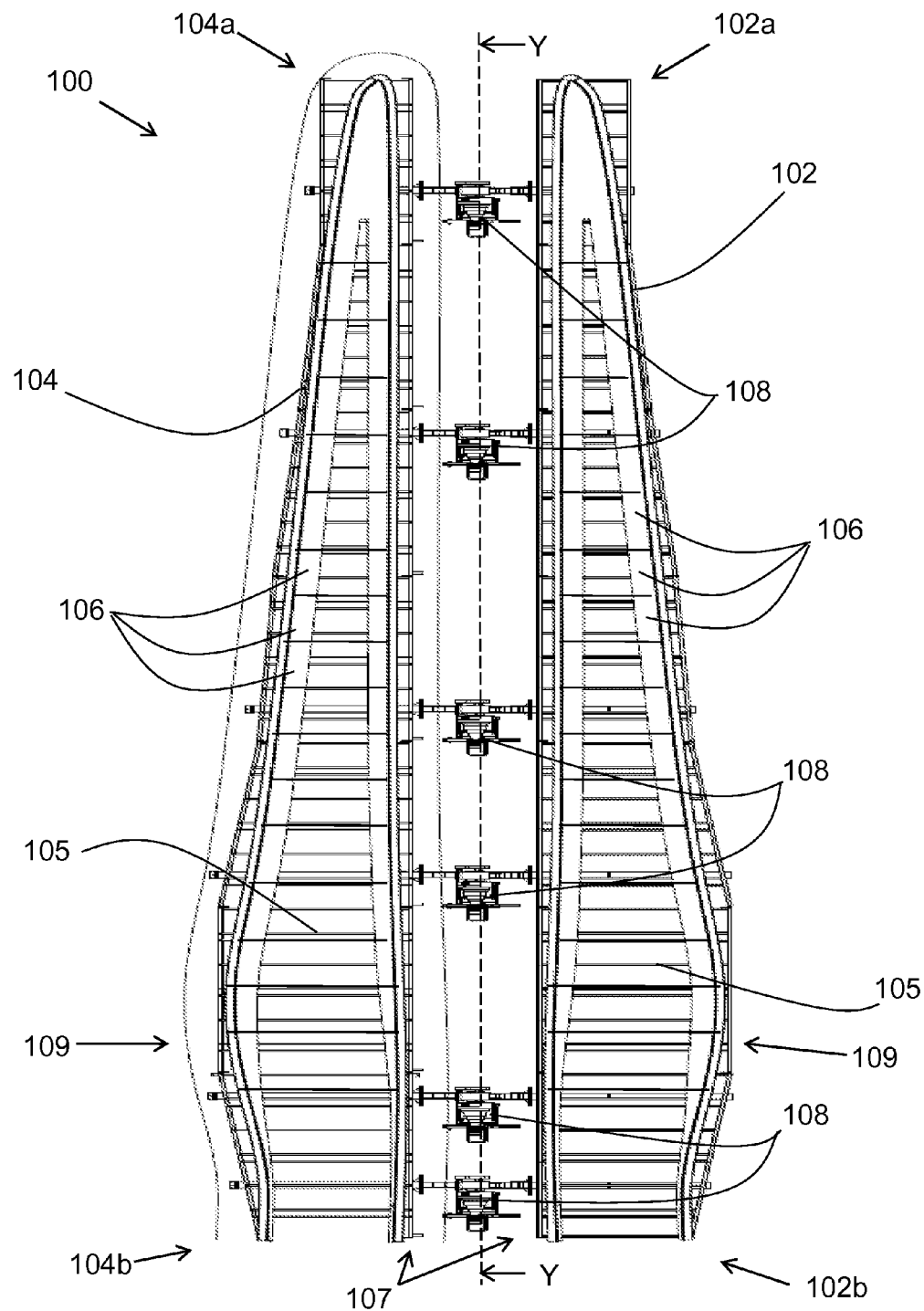
FIG. 5 is a top plan view of an embodiment of a post-moulding station for use in the manufacture of a wind turbine blade according to the invention.
Figure 6:
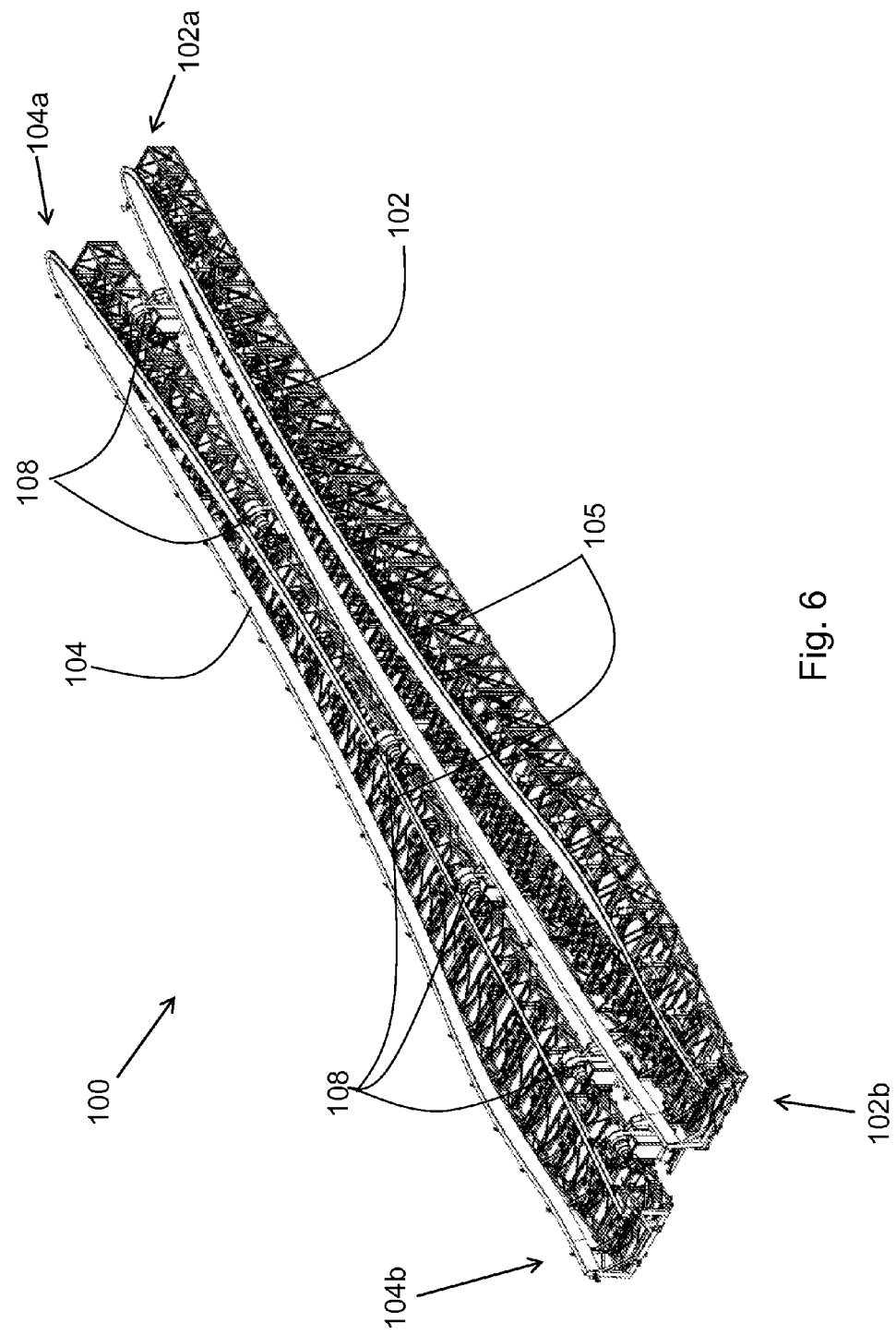
FIG. 6 is a perspective view of the post-moulding station of FIG. 5.

With reference to FIG. 5, the plan layout of the post-moulding station 100 is substantially symmetrical about the hinge axis Y, which extends through the plurality of hinging mechanisms 108. The first and second cradles 102,104 are connected to the hinging mechanisms 108 at the opposed sides 107 of the cradle bodies 105 corresponding to the leading edges of the blade shells to be received within the cradles 102,104. Accordingly, through the hinging of the first cradle 102 relative to the second cradle 104, the sides 109 of the cradle bodies 105 corresponding to the trailing edges of the blade shells to be received within the cradles 102,104 are brought into close alignment.

Figure 9:
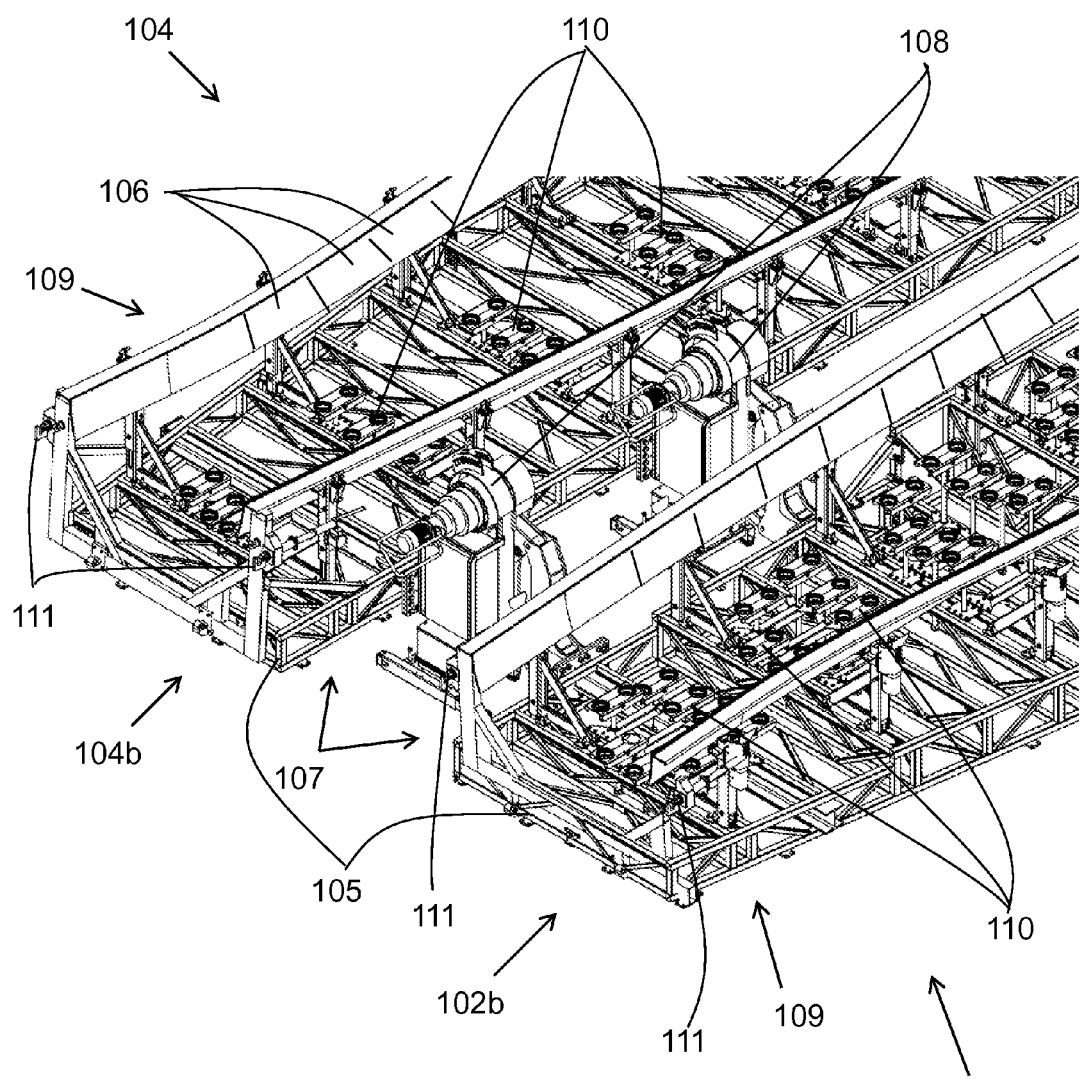
FIG. 9 is an enlarged perspective view of the root end of the post-moulding station of FIG. 5.

With reference to the enlarged view of the root end of a post-moulding station 100 shown in FIG. 9, the first and second cradles 102,104 each comprise opposed arrays of side support elements 106 located at the respective opposed leading edge side 107 and trailing edge side 109 of the open-frame cradle body 105 of each cradle 102,104. The cradles 102,104 each further comprise an array of support pads 110 provided on the cradle body 105, between the leading edge side 107 and the trailing edge side 109 of the cradle body 105. The support pads 110 provide a primary support surface, operable to bear a substantial portion of the weight of the blade shell to be received in the cradle 102,104.

The array of side support elements 106 and the array of support pads 110 extend in a longitudinal direction along the length of the cradle body 105, substantially corresponding to the length of the blade shell to be received in the cradle 102,104.

Figure 10A:
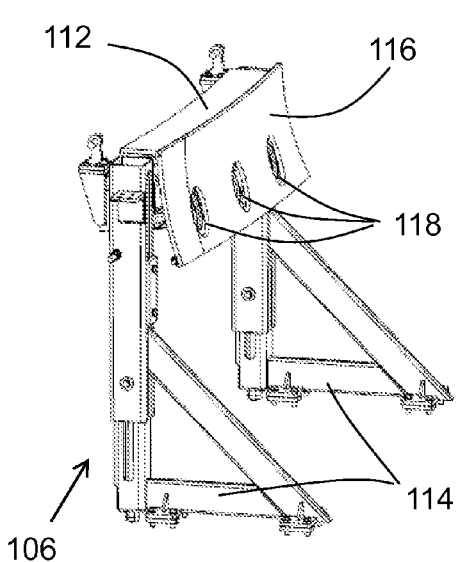
FIG. 10(a) is a front perspective view of a side support element of the post-moulding station of FIG. 5.
Figure 10B:
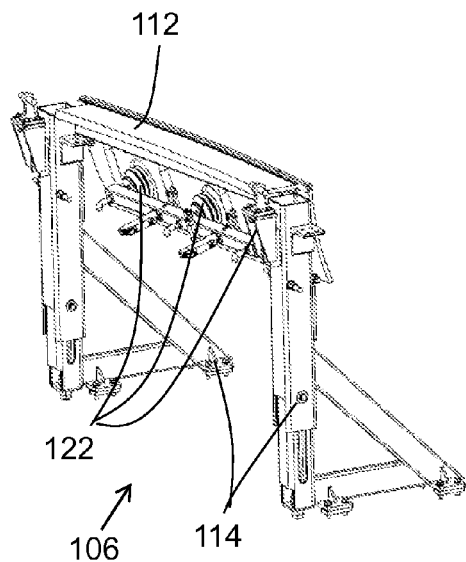
FIG. 10(b) is a rear perspective view of a side support element of the post-moulding station of FIG. 5.

An embodiment of an individual side support element 106 is illustrated in greater detail in FIG. 10. The side support elements 106 each comprise a support main body 112 which is provided on a pair of support legs 114 for attachment to the cradle body 105. As described above, the side support elements 106 may be moveable relative to the cradle body 105, preferably removable from the post-moulding station cradle 102,104, to provide easy access to a surface of a blade shell received within the cradle 102,104. For example, the side support elements 106 indicated in FIG. 9 may be removed from the cradle body 105, to provide access to that portion of the leading or trailing edge of a blade shell supported by the indicated elements.

Figure 11A:
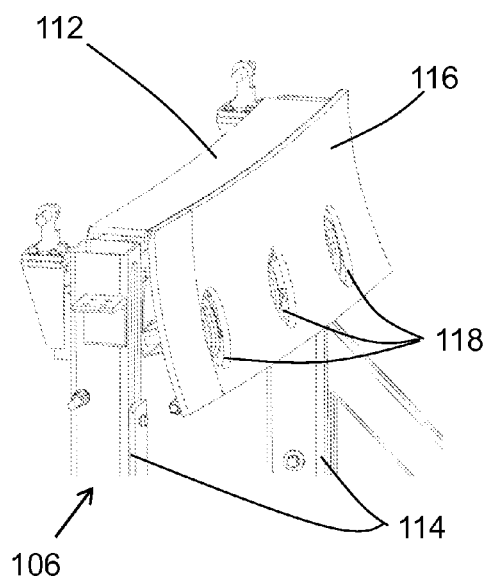
FIG. 11(a) is an enlarged perspective view of a side support element of FIG. 10 when the vacuum clamp members are retracted.
Figure 11B:
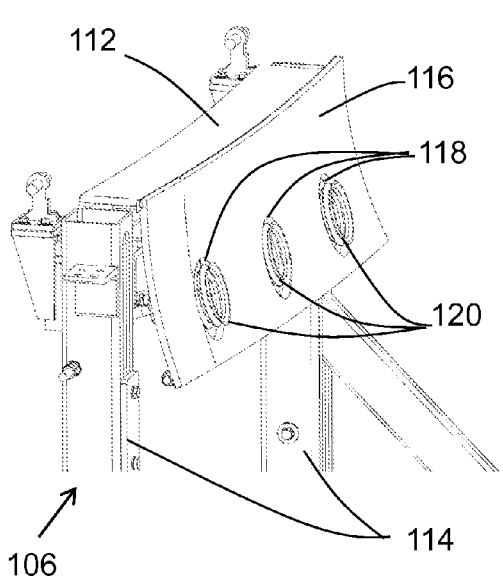
FIG. 11(b) is an enlarged perspective view of a side support element of FIG. 10 when the vacuum clamp members are advanced.

With further reference to the enlarged views of FIG. 11, the support 106 comprises a support main body 112 having a shell-facing surface 116 shaped to substantially conform to the external surface of a blade shell to be received in the post-moulding station 100, such that the shell-facing surface 116 of the support element 106 is provided adjacent the external surface of the blade shell when received in the post-moulding station 100.

A plurality of apertures 118 are defined in the shell-facing surface 116 of the main body 112, wherein a series of vacuum clamp members 120 are received in said plurality of apertures 118. The vacuum clamp members 120 comprise a substantially circular body, and are linearly translatable relative to the main body 112 of the support element 106, the vacuum clamp members 120 coupled to linear actuators 122 located on the opposite side of the main body 112 to the shell-facing surface 116, as indicated in FIG. 10(*b*).

The vacuum clamp members 120 are actuatable from a first recessed position, as indicated in FIG. 11(*a*), wherein the vacuum clamps 120 are positioned within the apertures 118 of the support element body 112 and do not substantially project beyond the shell-facing surface 116 of the main body 112, to a second advanced position, as indicated in FIG. 11(*b*), wherein the vacuum clamps 120 project proud of the shell-facing surface 116 of the main body 112. The vacuum clamp members 120 are operable to apply a vacuum clamping pressure to the external surface of a blade shell received within the post-moulding station 100, to secure the blade shell within the cradles 102,104 of the post-moulding station 100.

It will be understood that the side support elements 106 may have any suitable configuration, e.g. the side support elements 106 might not comprise the vacuum clamping members 120 of the embodiment of FIGS. 10 and 11, i.e. the side support members 106 may be operable to simply support a blade shell received in the cradles 102,104.

It will be understood that individual side support elements 106 may be removable by detaching the support main body 112 from the pair of support legs 114, to provide access to a surface of a received blade shell. Additionally or alternatively, the entire side support element 106, including the pair of support legs 114, may be removable from the cradle body 105, to provide said access.

Additionally or alternatively, it will be understood that the side support elements 106 may be height adjustable, e.g. by variation of the height of the support legs 114, wherein access to a supported surface can be provided by adjusting the height of the side support element 106 in question. Additionally or alternatively, it will be further understood that said support main body 112 may be pivotably coupled to said support legs 114, such that the support main body 112 may be pivoted or hinged relative to said support legs 114, and accordingly relative to an adjacent surface of a received blade shell, to provide access to said surface.

During use of the manufacturing system according to the invention, when the post-moulding station 100 is idle (i.e. not containing a blade shell) the vacuum clamp members 120 are initially provided in the first recessed position, such that the vacuum clamp members 120 are safely protected from any damage by the main body 112 of the support element 106.

In a further preferred aspect of the invention, the vacuum clamp members 120 of the side support elements 106 are operable to be moved relative to the cradle body 105 while a vacuum pressure is applied to the surface of a blade shell received within the cradle 102,104. This allows for minor adjustments to be made to the shape of the external surface of the blade shell, as the vacuum clamp members 120 are operable to push and/or pull the surface of the blade shell to which they are clamped to, to deform the blade shell into a desired profile or contour.

Returning to FIG. 9, the support pads 110 of the post-moulding station 100 are operable to be arranged to follow the aerodynamic profile of a blade shell to be received within the cradles 102,104.

In a preferred embodiment, for a particular construction of wind turbine blade, the support pads 110 are arranged on the cradle body 105 based on the profile of the wind turbine blade shell, to follow a nominal line corresponding to locations on the external surface of the blade shell matching the point of maximum distance from the external surface of the blade shell to the chord 60 of the wind turbine blade formed by said shell. Such a nominal line would correspond to the deepest section of the blade section received within the cradle 102,104. Such an arrangement thereby provides the most efficient location for the support pads 110 in the cradle 102,104, being arranged to support the lowest points of the surface of the blade shell along the length of the blade shell when received in the cradle 102,104.

Additionally or alternatively, in a further preferred embodiment, the support pads 110 are arranged on the cradle body 105 based on the design of the blade shell to be received in the cradle, along a notional line corresponding to the outline of the shear web or webs to be provided in the wind turbine blade. Such a notional line corresponds to that section of the finished blade having the greatest reinforcement and structural loading capability, and accordingly is most suitable to absorb the forces involved in the point-loading support of the post-moulding station, where the blade shell can effectively be supported on a plurality of individual vacuum clamp supports.

The support pads 110 are preferably moveable on the cradle body 105 between the leading edge side 107 and the trailing edge side 109 of the respective cradles 102,104. For example, the support pads 110 may be provided on a lockable shuttle element (not shown) carried on at least one frame bar extending across the cradle body 105 between the leading edge side 107 and the trailing edge side 109 of the cradle body 105. Furthermore, the support pads 110 may be pivotably mounted to the respective cradle bodies 105, allowing for the orientation of the support pads 110 to be adjusted as required.

In a further aspect, the support pads 110 may be provided on a height-adjustable arm (not shown), such that the height of the support pads 110 relative to the adjacent cradle body 105 surface may be varied. Accordingly, the location, orientation and/or height of the support pads 110 may be adjusted based on the aerodynamic profile of the blade shells to be received within the cradle 102,104. It will be understood that the support pads 110 may comprise simple support units, and/or the support pads may comprise a vacuum clamping mechanism similar to that described in FIGS. 10 and 11 for the side support elements 106, and may be further operable to be translationally adjustable relative to the cradle body.

It will be understood that the vacuum pressure applied in the vacuum clamps of the cradle may be adjusted and regulated to provide for secure retention of blade shells within the cradle.

In an example of such a suitable pressure control method, the vacuum clamps of the primary support pads 110 may be cycled through different pressure levels to allow for the 'settling' of a blade shell into the cradle. Taking the primary support pads 110 as an array of individual sets of vacuum clamps extending from the root end of a cradle to the tip end of a cradle, as a blade shell is initially lowered into the cradle, with an optional blade root flange affixed to the cradle frame to align the blade shell with the body of the cradle, a vacuum pressure is applied in the first set of vacuum clamps adjacent the root end of the cradle, pulling the surface of the blade shell towards said first set of clamps. Next, a vacuum pressure is applied in the adjacent second set of clamps, pulling the blade shell towards said second set. While the vacuum pressure is being applied in the said second set of clamps, the vacuum pressure is released in the preceding first set, to allow the blade shell surface to settle towards the clamps of the second set. Once settled, a vacuum pressure can be applied to the adjacent third set of vacuum clamps, before the vacuum pressure is released in the second set to allow the blade to further settle in the cradle.

At that time, a further vacuum pressure is applied in an adjacent third set of clamps, with the vacuum in the second set then released to enable the blade shell surface to settle at the third set of clamps. This cycled application and release of vacuum pressure along the length of the cradle allows for the blade shell to be securely and relatively delicately retained in the cradle.

It will be understood that a vacuum may be re-applied in the preceding vacuum clamp sets, as the cycle continues along the length of the cradle between the root and tip ends of the cradle.

Figure 12:
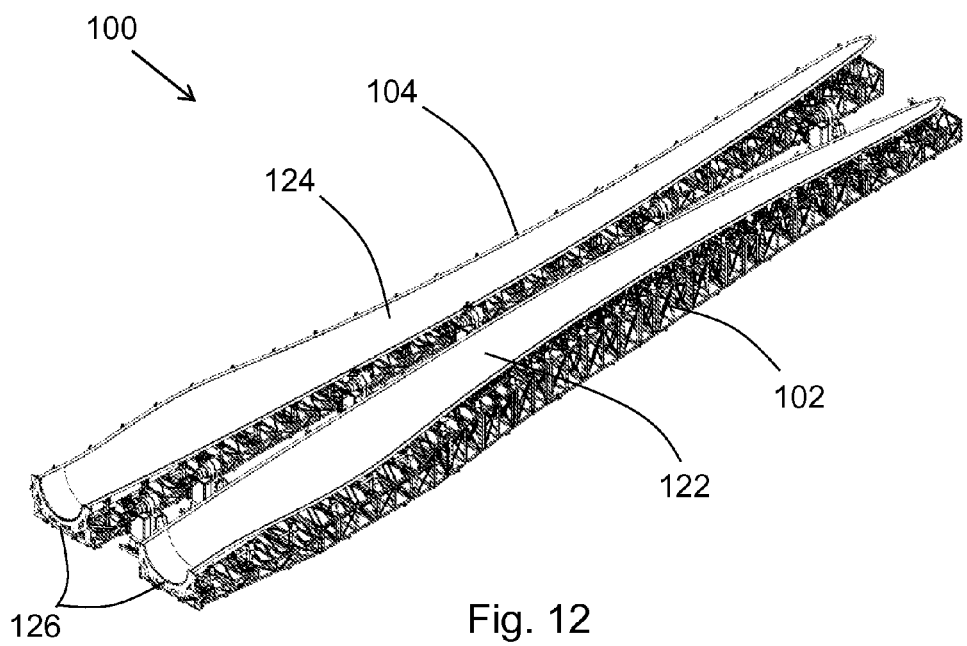
FIG. 12 is a perspective view of the open post-moulding station of FIG. 5 when supporting a pair of cured blade shells.
Figure 13:
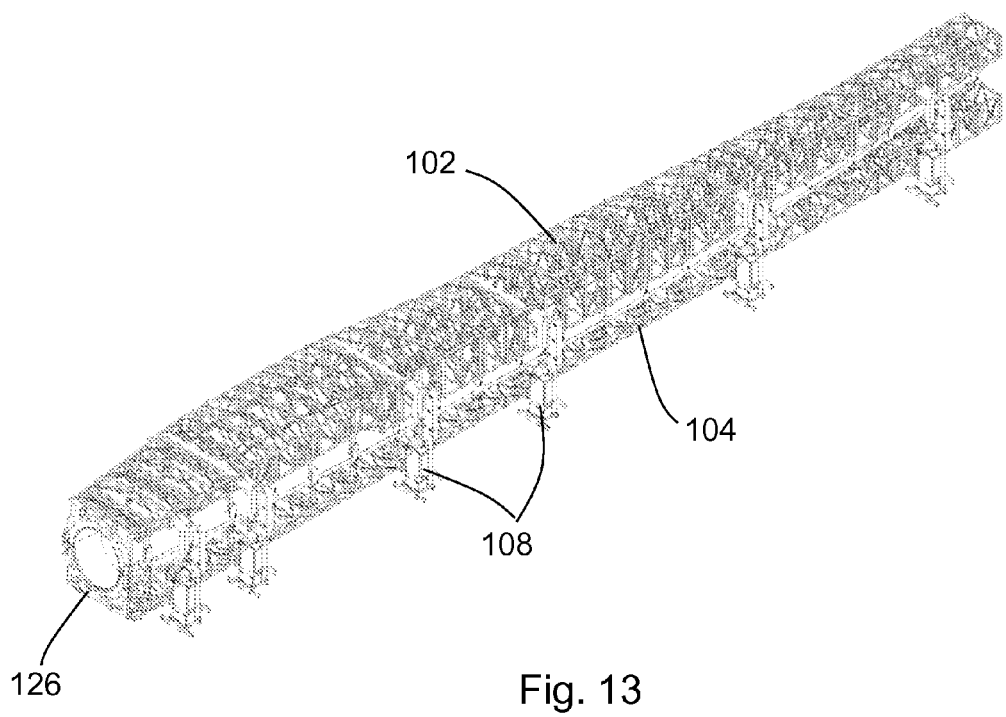
FIG. 13 is a perspective view of the post-moulding station of FIG. 12 when closed.
Figure 14:
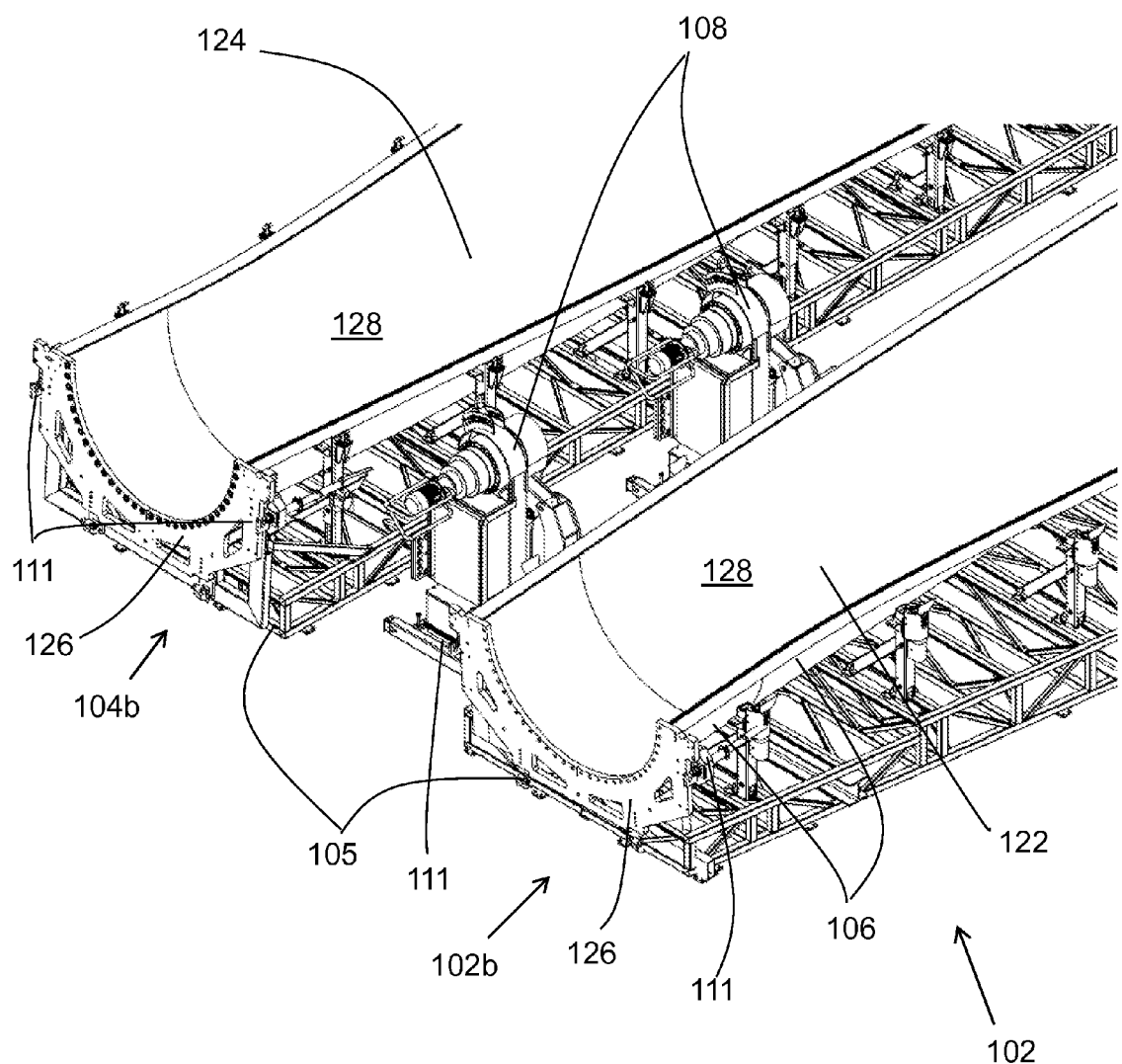
FIG. 14 is an enlarged perspective view of the root end of the post-moulding station of FIG. 12.

With reference to FIGS. 12-14, a post-moulding station 100 is shown when having first and second blade shells 122,124 received within said first and second cradles 102, 104 respectively.

As a blade shell 122,124 is transferred to a cradle 102,104 of the post-moulding station 100 from the blade moulding station 70, the external surface of the blade shell 122,124 may initially rest upon the support pads 110 extending along the longitudinal direction of the cradle body 105. The blade shell 122,124 may also rest against a selection of the side support elements 106.

Preferably, as the cured blade shell 122,124 is formed in the blade moulding station 70, a blade root flange 126 is provided at the root end of the cured blade shells 122,124. The blade root flange 126 comprises a substantially semi-circular metal flange provided about the end of the blade shell 122,124, and is used as the mounting point for the finished wind turbine blade. The flange 126 comprises a plurality of bolt holes provided about the circumference of the flange 126.

In this preferred embodiment, the cradles 102,104 comprise at least one blade root flange coupling element 111 provided at the respective root ends 102b,104b of the cradles 102,104. Accordingly, with reference to FIG. 14, as the cured blade shell 122,124 is transferred to the appropriate cradle 102,104, the blade root flange coupling element 111 is secured to the blade root flange 126 of the blade shell 122,124, to provide an anchor point for the blade shell 122,124 in the cradle 102,104.

In the case of wind turbine blades wherein the external blade shell 122,124 is designed as a load-bearing structure, as the root of the blade is designed to support the weight of the entire blade during normal operation, the blade root flange 126 provides an effective anchor and support point for the blade shell 122,124, at least during the initial action of transferring the blade shell 122,124 to the post-moulding cradle 102,104. Furthermore, as the coupling of the blade root flange 126 to the blade root flange coupling element 111 of the cradle 102,104 presents a defined location for a basic structural component of the blade shell 122,124, the location of the remaining surfaces and edges of the blade shell 122,124 may be relatively easily predicted, e.g. the location of the tip end 102a,102b, and the leading and trailing edges along the length of the shell.

Accordingly, the mounting of the blade root flange 126 to the cradle 102,104 allows for the surfaces of the blade shell 122,124 and the support components of the post-moulding cradle, i.e. the side support elements 106 and the support pads 110, to be relatively easily aligned for effective support of the surfaces of the cured blade shell 122,124 by the cradle 102,104.

It will be understood that the blade root flange coupling element 111 may comprise a clamp arranged to couple with a blade root flange 16 of a cured blade shell 122,124. Additionally or alternatively, the blade root flange coupling element 111 may comprise a bolt circle corresponding to a bolt circle defined on the blade root flange 126 of the blade shell 122,124, to allow for bolting of the blade root flange 126 to the cradle 102,104.

In a preferred aspect, the main body 116 of the side support elements 106, and/or the support pads 110, are formed from a cushioned material which is operable to prevent damage to the external surface of a blade shell 122,124 received in the cradle 102,104 when bearing against said external surface.

Once the cured blade shells 122,124 are secured within the cradles 102,104 via the blade root flange 126 coupling, the vacuum clamping members 120 of the side support elements 106 and/or the support pads 110 are actuated to the said second advanced position bearing against the external surface of the blade shells 122,124, and a vacuum applied against the surface of the cured blade shells 122,124 to completely secure the shells in position in the cradles 102,104.

It will be understood that further securing mechanisms may be applied to secure the blade shells 122,124 within the cradles 102,104, e.g. mechanical clamps (not shown) may be applied from the cradles 102,104 about the edges of the shells 122,124 in the cradles, to provide a further securing effect.

At this point, as described above, suitable post-moulding operations may be performed on the blade shells 122,124, with direct access provided to the internal surfaces (128, FIG. 14) of the blade shells 122,124 and access provided to portions of the external surfaces of the blade shells 122,124 via appropriate removal or adjustment of the adjacent side support elements 106 and/or support pads 110.

Examples of post-moulding operations which can be performed at the post-moulding station 100 on the blade shells 122,124 can include, but are not limited to: a blade shell repair operation, involving a repair of any minor defects in a cured blade shell; a blade shell cutting or grinding operation, wherein a portion of a surface of the cured blade shell can be cut away or ground to present a relatively smooth profile; a gluing operation, wherein an adhesive is applied to a surface of a blade shell to bond components or blade shells together; a coating operation, wherein an external surface of a blade shell is coated with a coating layer, e.g. a gel coat or suitable erosion resistant material; a laminate installation operation, wherein a main laminate or other element of the interior of a wind turbine blade may be fixed to an internal surface of one of the blade shells for positioning in the interior of a wind turbine blade; an overlamination operation; installation of internal blade components, e.g. load or deflection monitoring sensors, lightning protection systems, etc.; a survey of blade shell geometry; a secondary curing operation in, for example, an oven; or any other suitable manufacturing or assembly operations.

In a preferred embodiment of the invention, the post-moulding station 100 further comprises a rail or other suitable carriage mechanism (not shown) provided along at least one of the leading edge side 107 or the trailing edge side 109 of the cradle body 105 of at least one of the first and second cradles 102,104, wherein the rail is operable to support an automated tool for performing a post-moulding operation on a cured blade shell 122,124 received in said cradle 102,104. An example of such a tool includes but is not limited to an automated grinding tool, for grinding a surface of a cured blade shell 122,124, or an automated coating tool, for applying a coat to a surface of a cured blade shell 122,124. Additionally or alternatively, the cradles of the post-moulding station may comprise a mounting element at the root end of the cradles arranged to receive a root grinding tool, for appropriate grinding of the root end of the blade shells or of the root end of a finished wind turbine blade.

Once the appropriate post-moulding operations are completed, an adhesive is applied to the leading edge and the trailing edge of at least one of the cured blade shells 122,124. The first cradle 102 is then hinged relative to the second cradle 104 using the hinging mechanisms 108, i.e. the post-moulding station is closed as shown in FIG. 8(b), such that the contained first blade shell 122 is positioned in substantial alignment with the second blade shell 124 contained in the second cradle 104, as shown in FIG. 13. At this point, the first cradle 102 and the contained blade shell 122 may be translationally moved, as described in FIG. 8(b), to align the edges of the cured blade shells 122,124 and to correct for any possible over- or under-bite between the shells after the hinged closing operation.

A final translational movement of the first cradle may then be performed, to close the first and second blade shells 122,124 together to form a complete wind turbine blade. The cradles 102,104 and the contained shells 122,124 are maintained in the closed arrangement of FIG. 13 until the adhesive has set to bond the first shell 122 to the second shell 124. During the bonding time of the adhesive, the side support elements 106 are operable to apply pressure against the sides of the contained blade shells 122,124, to ensure that a correct adhesive bonding pressure is maintained at the leading edge and the trailing edge of the shells 122,124 to provide a strong and effective bond between the shells 122,124.

In addition, during the bonding time, the side support elements and/or the support pads may be removed or adjusted to provide access to sections of the external surfaces of the blade shells 122,124, to allow additional post-moulding operations to be carried out on the blade shells 122,124 while the cured shells are bonding together.

The provision of a post-moulding station allows for the optimisation of a manufacturing system for a wind turbine blade, as the occupancy time of the relatively expensive blade moulds 70 can be minimised by transferral of cured blade shells to a post-moulding station 90,100 once the moulding of the shells has completed. Furthermore, the flexible open-framed structure of the post-moulding station 90,100 allows for numerous manufacturing operations to be relatively easily carried out on the cured blade shells, even during the bonding operation.

Figure 15A:
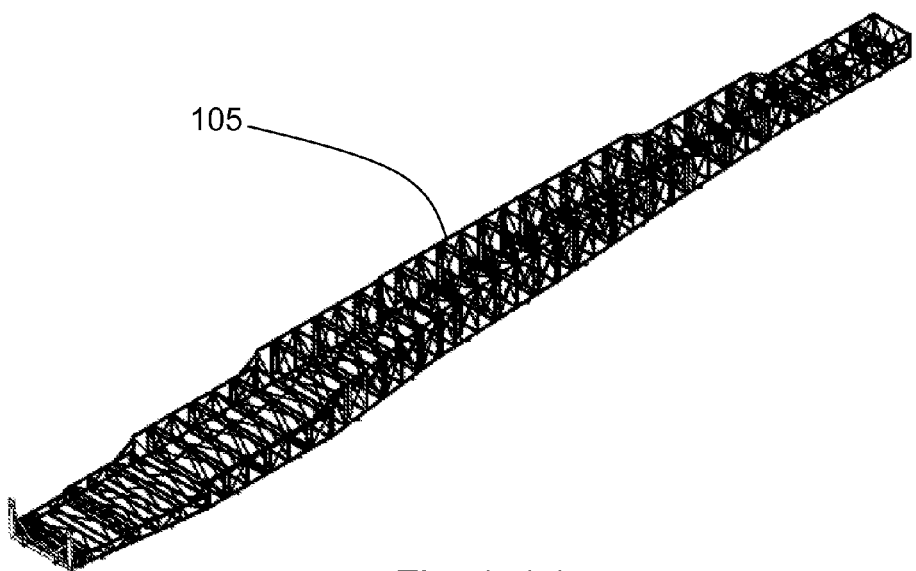
FIG. 15(a) is a perspective view of a cradle body of a first cradle of the post-moulding station of FIG. 5.

With reference to FIG. 15, an open-frame cradle body 105 for a post-moulding station 100 is illustrated, minus the side support elements 106, support pads 110 and turning mechanisms. As can be seen in FIG. 15(a), the cradle body 105 comprises an open-framed structure having a length substantially corresponding to the length of the cured blade shell to be received by the cradle. The cradle body 105 has a profile which varies in height and/or width, dependent on the profile of the cured blade shell to be received in the cradle. The cradle body 105 shown in FIG. 15(a) has a greater height in the middle section of the body 105 along the length of the body 105, accordingly the cradle body 105 shown in FIG. 15(a) is suitable for receiving a pre-bent blade shell, in particular a pressure side shell of a pre-bent wind turbine blade. It will be understood that the dimensions and profile of the cradle body 105 may be varied as required to provide adequate support for the particular blade shell to be supported by the cradle.

Figure 15B:
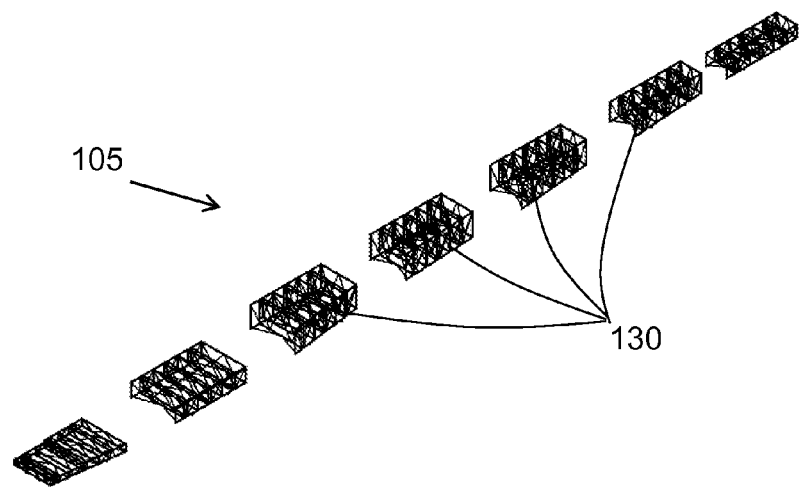
FIG. 15(b) is a perspective view of the cradle body of FIG. 15(a) when disassembled into separate modular sections.

With reference to FIG. 15(b), the cradle body 105 may be composed from a plurality of modular sections 130 assembled together to form the cradle body 105, preferably a plurality of modular steel trestles. The modular sections 130 may vary in dimensions, e.g. in section width and/or height, and are interchangeable such that the structure of the cradle body 105 may be varied dependent on the characteristics of the blade shell to be supported by the cradle, e.g. blade length, chord width, camber, etc.

The use of such a modular construction allows for a greater flexibility of the overall manufacturing system, as cradles can be easily constructed suitable for different blade designs, with individual cradles and modular sections re-used for different manufacturing processes.

While in the above embodiment of the invention an entire blade shell is moulded using a single blade mould, in a further alternative embodiment, the blade shells 122,124 may be manufactured as individual blade shell sections in separate blade moulds, the individual blade shell sections provided for later assembly into a complete blade shell or wind turbine blade.

For example, a blade shell may be formed as a separate blade root section, a blade tip section, an intermediate aerodynamic section, etc., with each section manufactured in a separate blade mould designed to form that particular section of the blade shell. The individual sections may then be transferred from the different blade moulds to a post-moulding station as described above, wherein assembly of the different sections can be performed to form a complete blade shell, with subsequent closing and bonding of the complete blade shells to form the wind turbine blade.

Alternatively, the individual blade sections of the first and second blade shells may be closed and bonded before assembly into a complete wind turbine blade. i.e. the upwind and downwind blade root sections may be closed to form a complete blade root portion, the upwind and downwind blade aerodynamic sections may be closed to form a complete blade aerodynamic portion, etc., which can then be assembled to form the complete blade.

This may provide a further optimisation of the manufacturing process, as individual sections may be manufactured according to different requirements, e.g. structural requirements. In such a system, the post-moulding station of the invention provides a flexible and practical assembly bench for coupling the individual sections together.

While the embodiment of FIG. 4 illustrates a manufacturing system wherein the post-moulding station is provided locally to the blade moulds, it will be understood that alternative arrangements of manufacturing systems may be provided. For example, the blade shells may be manufactured at a first location using blade moulds, as described above. The cured shells may then be demoulded, and transported to a post-moulding station provided at a relatively remote location for further manufacturing operations and eventual assembly. Such a system allows for the precision moulding of the blade shell parts to be conducted at a centralised location, using dedicated equipment and a focused workforce, with the relatively easier post-moulding and assembly tasks performed at distributed locations, e.g. adjacent a wind park under construction. This approach provides for a greater distribution of resources and a more efficient manufacturing process overall, combined with reduced transportation costs as readily stackable shells may be transported as opposed to finished wind turbine blades.

Additionally or alternatively, the cradles may be moveable, and provide a support frame for blade shells and/or complete wind turbine blades for the handling of such items at a manufacturing facility and/or at an installation site.

Figure 16:
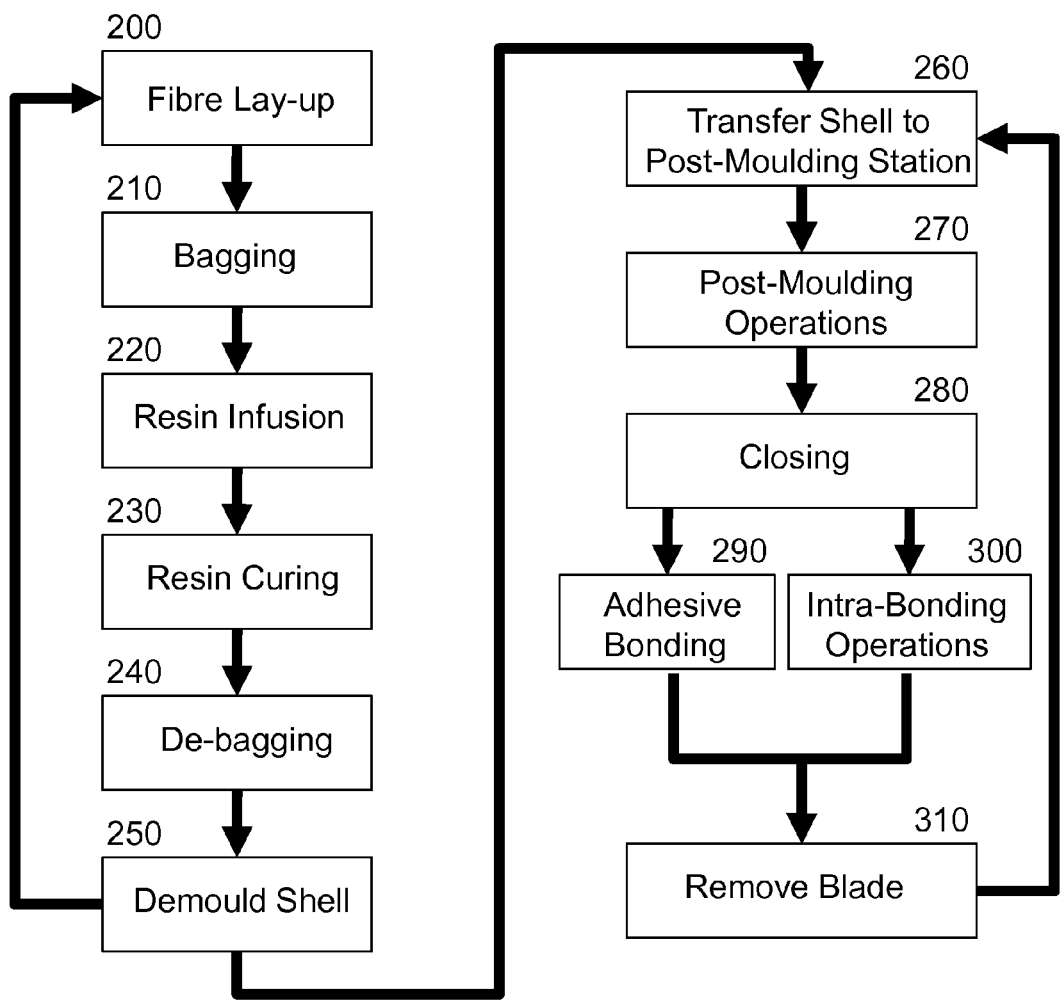
FIG. 16 is an overview of the manufacturing process according to the invention.

An overview of manufacturing process according to an aspect of the invention is provided in FIG. 16. Initially, a fibre lay-up is performed in a blade mould (step 200). Such a lay-up operation may be an automatic or machine-controlled lay-up, or a hand lay-up operation. It will be understood that additional manufacturing operations may be performed at this stage, for example the blade mould may be coated with an initial layer of gel coat prior to the fibre lay-up.

Once lay-up is complete, a vacuum bag is provided over the fibre layers in the blade mould (step 210). Once the bag forms a seal about the fibre layers, resin infusion is started (step 220), and a resin infused into the fibre layers in the mould. The resin is allowed to cure (step 230), to bond the fibre layers in the mould and to form a cured blade shell.

As described above, the actual blade shell may continue to cure within the body of the blade shell for several hours after the initial curing process, but it is understood in the context of this description that a cured blade shell refers to a blade shell which has undergone this initial curing step, and can be handled without experiencing considerable structural deformation.

Once cured, the vacuum bag is removed from the mould (step 240), and the cured blade shell can be removed or demoulded from the blade mould (step 250). This demoulding step may be performed using any suitable blade shell lifting device, e.g. a crane or vacuum lifting device.

At this point in the manufacturing process, as the cured blade shell has been removed from the blade mould, the blade mould may be re-used to form a second cured blade shell. Accordingly, the process branches off at this point, and loops back to the initial fibre lay-up step (200). As the blade moulds have a relatively low occupancy time, the production rate of the individual mould is increased, leading to improved production times for the entire manufacturing process. Furthermore, as the blade moulds are not used for post-moulding operations and/or turning operations, the blade moulds may be of a simpler construction, and/or comprise a structure which may be fixed to the factory floor, e.g. having concrete foundations, which provides for easier and cheaper manufacture and implementation of new moulds for a new manufacturing process.

Once the cured blade shell has been demoulded from the blade mould, the shell is transferred to a post-moulding station according to the invention (step 260). At this point, the blade shell may be secured to the post-moulding station, e.g. through coupling the blade root flange of the blade shell to the root end of a cradle to receive the blade shell, the application of vacuum clamps against the external surface of the blade shell, etc.

It will be understood that the process may further include a post-moulding station calibration step (not shown), prior to an initial transferral step 260. This step may involve the calibration of the cradles of the post-moulding station to receive the blade shells, e.g. through appropriate adjustment of the various cradle supports to ensure that a blade shell is securely received and supported in the cradle. In one approach, the original master plug used for the milling of the blade mould may be used to calibrate the cradle supports, i.e. a cradle may be positioned on the surface of the master plug, and the various supports adjusted to securely abut the surface of the master plug, thereby ensuring that the supports of the cradle match the corresponding support profile of the blade mould in question.

Once the shell is received in the cradle of the post-moulding station, various post-moulding operations as described above may be performed on the secured blade shell (step 270). These operations may be carried out on any surface of the cured blade shell via the open-framed structure of the cradle body, and through appropriate removal or adjustment of the support elements and/or support pads of the cradle.

In addition, imperfections in the cured blade shell may be corrected, e.g. minor shape adjustments may be made to the profile contours of the blade shell by securing vacuum clamps against the surface of the blade shell, and subsequently moving the vacuum clamps to accordingly push and/or pull the surface of the blade shell into a preferred profile.

Once the various post-moulding operations have been completed, the post-moulding station may be closed (step 280), such that a first cured blade shell may be bonded with a second cured blade shell to form a wind turbine blade.

In parallel to the time required for the adhesive between the two blade shells to bond effectively (step 290), various intra-bonding operations may be performed at the post-moulding station on the contained blade shells (step 300). Such operations may include any manufacturing operations which may be applied on the shells during the bonding action, and may include any suitable post-moulding operations as described above, e.g. surface grinding, coating, etc. As with step 270, access may be provided to the surfaces of the blade shells through the open-framed structure of the cradle body, as well as through appropriate removal or adjustment of the support elements and/or support pads of the cradle.

The possibility to perform operations on the blade shells (step 300) in parallel to the bonding (step 290) provides for a further increase in the productivity of the manufacturing process, providing for less-down time of workers, equipment, etc., in comparison to prior art systems wherein a closing operation using turnable blade mould would prevent any access to the surfaces of the blade shells while the adhesive sets to bond the shells together.

Once the cured blade shells have bonded together to form a wind turbine blade, the post-moulding station may be opened and the completed blade removed from the post-moulding station (step 310), for any finishing operations and subsequent transport from the manufacturing facility. It will be understood that any finishing operations may be performed while the completed blade is supported by the post-moulding station.

Once the completed blade is removed from the post-moulding station, the process can loop back to step 260, to receive a new cured blade shell at the post-moulding station.

The manufacturing system of the invention provides for an improvement in productivity and effectiveness of the individual manufacturing components, and results in a greater efficiency of the blade manufacturing process, reducing ineffective down-time of the blade moulds, and providing a system where different manufacturing operations may be performed in parallel which were traditionally performed in series.

It will be understood that various alternative arrangements and implementations of manufacturing processes may be considered. For example, in one alternative, a manufacturing system is provided wherein a first blade mould performs a turning operation to demould a first contained cured blade shell onto an inverse blade cradle (i.e. when supported on the blade cradle, the external surface of the cured blade shell faces upwards). In this case, the post-moulding operations may performed on the inverted shell. A second cured blade shell may be lifted out of a second blade mould as previously described, with the webs, etc., installed on the internal surface of the second blade shell. Accordingly, a lifting device is operable to lift the inverted first shell to position it in place on top of the second blade shell for bonding.

Some advantages of this approach include that the demoulding operation may be performed at same time for both blade shells, with only a single lifting device required (i.e. the second one shell is demoulded using the lifting device, while the first shell is demoulded using the hinging mechanism of the mould. Furthermore, the lifting device can be reused at the time of positioning the inverted first shell on top of the second shell, thereby increasing productivity of the lifting device.

In a further alternative, the blade cradles may be provided as a plurality of separate, discrete individual support components, which are each operable to support a particular point along the length of the blade shells. Advantages of this approach include that the separate components may be used as for example blade carts after the bonding operation, for easy local transportation of the bonded wind turbine blade. Furthermore, the individual components may provided for easier storage of the post-moulding station, as the individual components may be stored in a reduced-space location when not in use.

The invention is not limited to the embodiment described herein, and may be modified or adapted without departing from the scope of the present invention.

The invention claimed is:

1. A cradle for supporting at least a section of a wind turbine blade, the cradle comprising:
   a cradle body and
   at least one array of support members extending between a first end and a second end of the cradle, wherein the at least one array of support members comprise vacuum clamps arranged to receive a surface of the at least a section of a wind turbine blade, and
   wherein support members comprise a support surface having at least one aperture defined thereon, wherein at least one vacuum clamp is moveably mounted within the at least one aperture, the at least one vacuum clamp linearly actuatable from a first recessed position where the at least one vacuum clamp is held within the at least one aperture, to a second projecting position wherein the at least one vacuum clamp projects out from the at least one aperture, the at least one vacuum clamp standing proud of the support surface.

2. The cradle of claim 1, wherein the cradle body comprises an open-framed body, and wherein the vacuum clamps are translationally moveable relative to the cradle body.

3. The cradle of claim 1, wherein the at least one array of support members is arranged in a line between the first end and the second end of the cradle, wherein the line is configured to substantially correspond to a location of a shear web in a section of a wind turbine blade to be received in the cradle.

4. The cradle of claim 1, wherein the cradle further comprises first and second arrays of support members, wherein the first and second arrays are arranged in substantially parallel lines between the first end and the second end of the cradle, wherein the substantially parallel lines are arranged to extend along either side of a notional line corresponding to a location of a shear web in a section of a wind turbine blade to be received in the cradle.

5. The cradle of claim 1, wherein the cradle is arranged to selectively control pressure applied by the vacuum clamps of the at least one array of support members.

6. The cradle of claim 1, wherein the cradle is arranged to receive a section of a wind turbine blade comprising a portion of an upwind or a downwind section, and wherein the cradle comprises at least one array of secondary support members extending between the first end and the second end of the cradle, wherein the at least one array of secondary support members are arranged to support a leading edge or a trailing edge of the section of the wind turbine blade.

7. The cradle of claim 6, wherein the at least one array of secondary support members comprise vacuum clamps arranged to receive a surface of the at least a section of a wind turbine blade.

8. The cradle of claim 6, wherein the at least one array of secondary support members is formed from a plurality of individual support modules, wherein the plurality of individual support modules are selectively removeable from the at least one array of secondary support members.

9. The cradle of claim 1, the cradle further comprising:
   a first array of secondary support members arranged to support a leading edge of the at least a section of a wind turbine blade;
   a second array of secondary support members arranged to support a trailing edge of the at least a section of a wind turbine blade; and
   at least one array of primary support members arranged to support a portion of the at least a section of a wind turbine blade between the leading edge and the trailing edge.

10. A post-moulding station to receive an upwind wind turbine blade shell and a downwind wind turbine blade shell from a blade mould, the post-moulding station comprising first and second cradles, wherein the first and second cradles each comprise the cradle as claimed in claim 1.

11. A method of receiving a section of wind turbine blade in the cradle as claimed in claim 1 having an array of primary support members comprising vacuum clamps extending between the first end and the second end of the cradle, the method comprising the steps of:
   providing a first cradle to receive the section of wind turbine blade;
   positioning the section of wind turbine blade within the cradle such that a plurality of vacuum clamps bear against a surface of the section of wind turbine blade; and
   applying a vacuum in the plurality of vacuum clamps to retain the section of wind turbine blade in the cradle.

12. The method of claim 11, wherein the method further comprises the step of:
   controlling the vacuum applied in the plurality of vacuum clamps, comprising:

dividing the array of primary support members into a plurality of sets of vacuum clamps arranged in a numbered sequence between the first end and the second end;

starting at the first end of the cradle, applying a vacuum to a first set of vacuum clamps of the plurality of sets of vacuum clamps;

applying a vacuum to a second set of vacuum clamps of the plurality of sets of vacuum clamps;

releasing the vacuum in the first set of vacuum clamps of the plurality of sets of vacuum clamps to allow the section of wind turbine blade to settle on the second set of vacuum clamps of the plurality of sets of vacuum clamps; and re-applying a vacuum in the first set of vacuum clamps, wherein the controlling step further comprises:

sequentially repeating the above steps of applying, releasing, and re-applying a vacuum for adjacent sets of vacuum clamps in the array of primary support members, from the first end to the second end, to allow an entire section of wind turbine blade received in the cradle to settle on an entire array of vacuum clamps.

13. The method of claim 11, wherein the method comprises the additional step of:

configuring a profile of the support members in the cradle by:

adjusting the at least one array of support members to correspond to a profile of a blade mould master plug used to design blade moulds used to form the section of wind turbine blade to be received in the cradle.

14. A cradle for supporting at least a section of a wind turbine blade, the cradle comprising:

a cradle body and at least one array of support members extending between a first end and a second end of the cradle, wherein the at least one array of support members comprise vacuum clamps arranged to receive a surface of the at least a section of a wind turbine blade, and wherein the cradle further comprises at least one edge rail provided along at least a portion of a first side of the cradle, wherein the at least one edge rail is arranged to receive a blade processing tool for operation on at least a portion of a section of a wind turbine blade received in the cradle.

15. The cradle of claim 14, wherein the cradle body comprises an open-framed body, and wherein the vacuum clamps are translationally moveable relative to the cradle body.

16. The cradle of claim 14, wherein the at least one array of support members is arranged in a line between the first end and the second end of the cradle, wherein the line is configured to substantially correspond to a location of a shear web in a section of a wind turbine blade to be received in the cradle.

17. The cradle of claim 14, wherein the cradle further comprises first and second arrays of support members, wherein the first and second arrays of support members are arranged in substantially parallel lines between the first end and the second end of the cradle, wherein the substantially parallel lines are arranged to extend along either side of a notional line corresponding to a location of a shear web in a section of a wind turbine blade to be received in the cradle.

18. The cradle of claim 14, wherein the cradle is arranged to selectively control pressure applied by the vacuum clamps of the at least one array of support members.

19. The cradle of claim 14, wherein the cradle is arranged to receive a section of a wind turbine blade comprising a portion of an upwind or a downwind section, and wherein the cradle comprises at least one array of secondary support members extending between the first end and the second end of the cradle, wherein the at least one array of secondary support members are arranged to support a leading edge or a trailing edge of the section of the wind turbine blade.

20. The cradle of claim 19, wherein the at least one array of secondary support members comprise vacuum clamps arranged to receive a surface of the at least a section of a wind turbine blade.

21. The cradle of claim 19, wherein the at least one array of secondary support members is formed from a plurality of individual support modules, wherein the plurality of individual support modules are selectively removeable from the at least one array of secondary support members.

22. The cradle of claim 14, the cradle further comprising:

a first array of secondary support members arranged to support a leading edge of the at least a section of a wind turbine blade;

a second array of secondary support members arranged to support a trailing edge of the at least a section of a wind turbine blade; and at least one array of primary support members arranged to support a portion of the at least a section of a wind turbine blade between the leading edge and the trailing edge.

23. A post-moulding station to receive an upwind wind turbine blade shell and a downwind wind turbine blade shell from a blade mould, the post-moulding station comprising first and second cradles, wherein the first and second cradles each comprise the cradle as claimed in claim 14.

24. A method of receiving a section of wind turbine blade in the cradle as claimed in claim 14 having an array of primary support members comprising vacuum clamps extending between the first end and the second end of the cradle, the method comprising the steps of:

providing a first cradle to receive the section of wind turbine blade;

positioning the section of wind turbine blade within the cradle such that a plurality of vacuum clamps bear against a surface of the section of wind turbine blade; and applying a vacuum in the plurality of vacuum clamps to retain the section of wind turbine blade in the cradle.

25. The method of claim 24, wherein the method further comprises the step of:

controlling the vacuum applied in the plurality of vacuum clamps, comprising:

dividing the array of primary support members into a plurality of sets of vacuum clamps arranged in a numbered sequence between the first end and the second end;

starting at the first end of the cradle, applying a vacuum to a first set of vacuum clamps of the plurality of sets of vacuum clamps;

applying a vacuum to a second set of vacuum clamps of the plurality of sets of vacuum clamps;

releasing the vacuum in the first set of vacuum clamps of the plurality of sets of vacuum clamps to allow the section of wind turbine blade to settle on the second set of vacuum clamps of the plurality of sets of vacuum clamps; and re-applying a vacuum in the first set of vacuum clamps, wherein the controlling step further comprises:

sequentially repeating the above steps of applying, releasing and re-applying a vacuum for adjacent sets of vacuum clamps in the array of primary support members, from the first end to the second end, to allow an entire section of wind turbine blade received in the cradle to settle on an entire array of vacuum clamps.

26. The method of claim 24, wherein the method comprises the additional step of: configuring a profile of support members in the cradle by:

adjusting the at least one array of support members to correspond to a profile of a blade mould master plug used to design blade moulds used to form the section of wind turbine blade to be received in the cradle.

\* \* \* \* \*